United States Patent
Kang et al.

(10) Patent No.: US 9,769,686 B2
(45) Date of Patent: Sep. 19, 2017

(54) COMMUNICATION METHOD AND DEVICE

(71) Applicant: Samsung Electronics Co., Ltd., Suwon-si, Gyeonggi-do (KR)

(72) Inventors: Hyuk Kang, Yongin-si (KR); Geun-ho Lee, Seongnam-si (KR); Sang-hyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/277,868

(22) Filed: May 15, 2014

(65) Prior Publication Data

US 2014/0342670 A1    Nov. 20, 2014

(30) Foreign Application Priority Data

May 16, 2013    (KR) .................. 10-2013-0056050

(51) Int. Cl.
| | |
|---|---|
| *H04L 29/08* | (2006.01) |
| *H04L 29/06* | (2006.01) |
| *H04M 1/725* | (2006.01) |
| *H04W 4/00* | (2009.01) |
| *H04W 8/24* | (2009.01) |
| *H04M 1/2755* | (2006.01) |

(Continued)

(52) U.S. Cl.
CPC ........... *H04W 24/08* (2013.01); *H04L 67/303* (2013.01); *H04L 69/14* (2013.01); *H04L 69/18* (2013.01); *H04M 1/7253* (2013.01); *H04W 4/008* (2013.01); *H04L 69/24* (2013.01); *H04M 1/2755* (2013.01); *H04M 2250/02* (2013.01); *H04M 2250/12* (2013.01); *H04W 8/005* (2013.01); *H04W 8/24* (2013.01); *H04W 76/023* (2013.01)

(58) Field of Classification Search
CPC ..... H04W 24/08; H04W 4/008; H04W 4/005; H04W 8/005; H04W 76/023; H04W 8/24; H04M 1/7253; H04M 2250/02; H04M 2250/12; H04M 1/2755; H04L 69/14; H04L 69/24; H04L 69/18; H04L 67/303
See application file for complete search history.

(56) References Cited

U.S. PATENT DOCUMENTS

2004/0116075 A1 *   6/2004   Shoemake ............ H04W 28/10
                                                                      455/41.2
2004/0176032 A1     9/2004   Kotola et al.
(Continued)

FOREIGN PATENT DOCUMENTS

| KR | 10-2013-0030153 A | 3/2013 |
|---|---|---|
| WO | 2007-072135 A1 | 6/2007 |
| WO | 2012/170051 A2 | 12/2012 |

*Primary Examiner* — Lewis West
(74) *Attorney, Agent, or Firm* — Jefferson IP Law, LLP

(57) ABSTRACT

A communication method used by a first device that communicates with a second device is provided. The method includes detecting an occurrence of a predetermined event related to a device scan, scanning the second device that provides identifier information and capability information, establishing a first communication link with the scanned second device by using a first communication method, determining a second communication method for communicating data with the second device via the first communication link, and establishing a second communication link with the second device by using the determined second communication method.

29 Claims, 29 Drawing Sheets

(51) Int. Cl.
*H04W 76/02* (2009.01)
*H04W 8/00* (2009.01)
*H04W 24/08* (2009.01)

(56) References Cited

U.S. PATENT DOCUMENTS

| | | |
|---|---|---|
| 2006/0258289 A1 | 11/2006 | Dua |
| 2008/0003946 A1* | 1/2008 | Lee ................ H04W 8/005 |
| | | 455/41.2 |
| 2008/0200166 A1 | 8/2008 | McCamon |
| 2011/0028117 A1 | 2/2011 | Pan |
| 2011/0183620 A1 | 7/2011 | Eisenbach |
| 2012/0295541 A1* | 11/2012 | Kwon ................ H04W 76/023 |
| | | 455/41.1 |
| 2013/0029596 A1 | 1/2013 | Preston et al. |
| 2013/0178160 A1* | 7/2013 | Wang ................ H04W 48/10 |
| | | 455/41.2 |

* cited by examiner

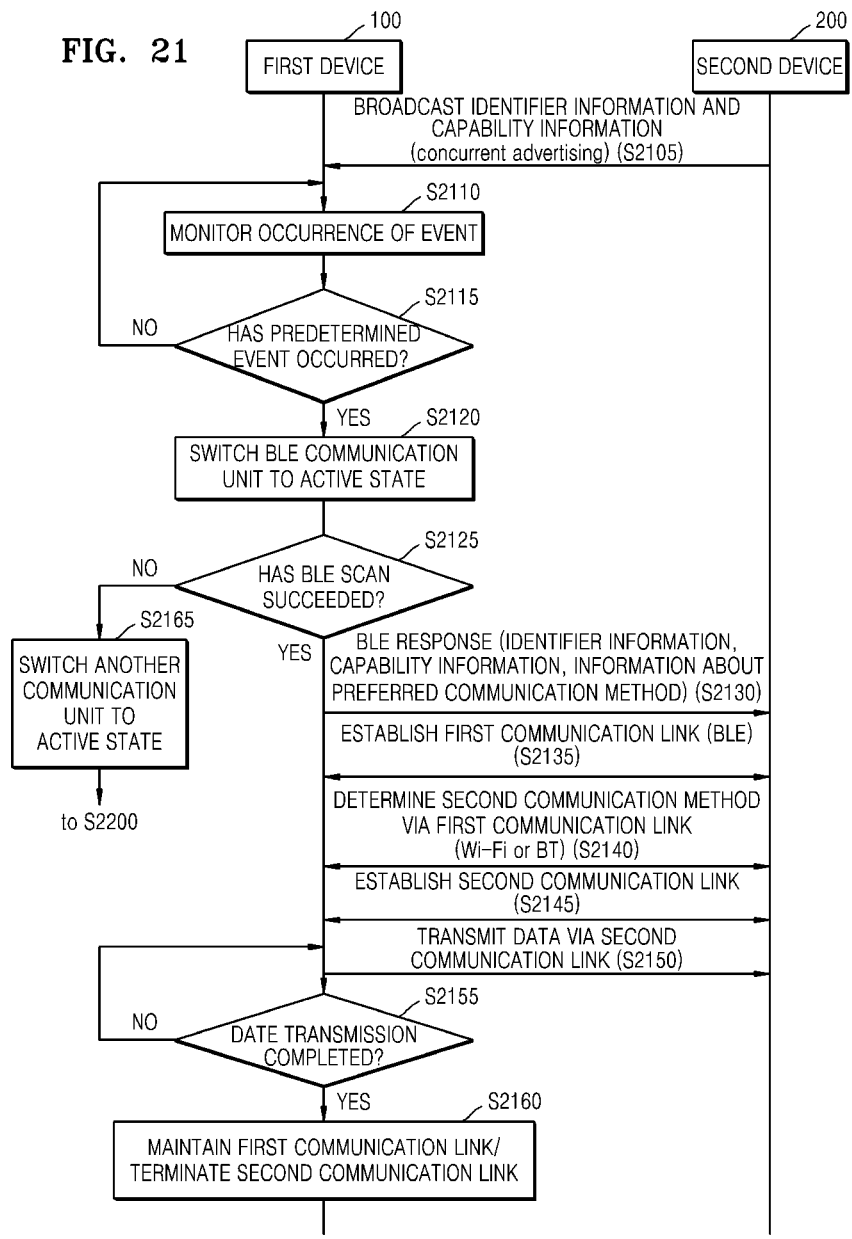

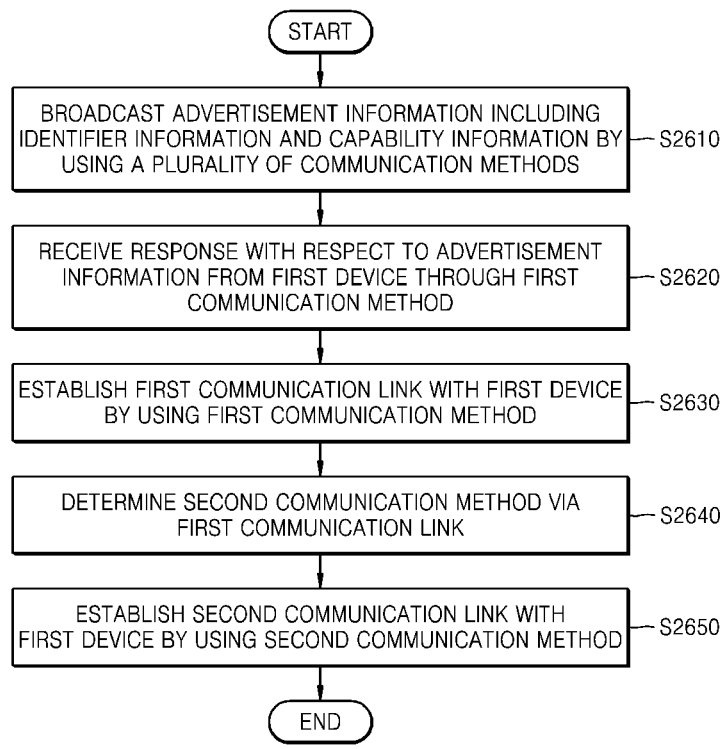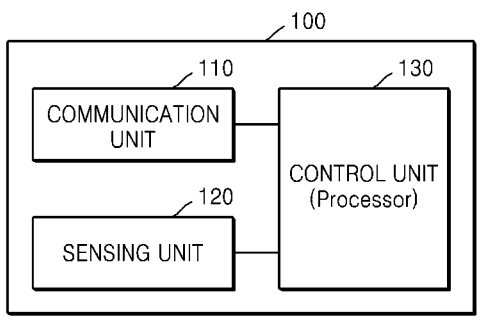

COMMUNICATION METHOD AND DEVICE

CROSS-REFERENCE TO RELATED PATENT APPLICATION(S)

This application claims the benefit under 35 U.S.C. §119(a) of Korean patent application filed on May 16, 2013 and in the Korean Intellectual Property Office assigned Serial number 10-2013-0056050, the entire disclosure of which is hereby incorporated by reference.

TECHNICAL FIELD

The present disclosure relates to a communication method for communicating data between devices and a device using the communication method.

BACKGROUND

Bluetooth technology enables short-range wireless communication, rather than having to use several cables to connect devices to each other. For example, when the Bluetooth wireless technology is implemented in a cellular phone and a laptop computer, the cellular phone and the laptop computer may be connected via a wireless communication network without having to make a cable connection. All digital devices, including printers, Personal Digital Assistants (PDAs), desktop computers, FAX machines, keyboards, joysticks, and/or the like, can be components of a Bluetooth system. In addition to providing devices with cable-free connections, the Bluetooth wireless technology can also be used to form an interface between an existing data network and peripheral devices and to form a special group between devices which are located far from a fixed network infrastructure. Bluetooth technology provides a strong wireless connection based on quick recognition and by using a frequency hopping method. A Bluetooth module prevents interference with other signals by hopping to a new frequency after transmission or reception of a packet. In contrast to other systems which operate within the same frequency range, the Bluetooth technology uses specially short and fast packets. Since Bluetooth version 4.0, which has all of the functions provided by Classic Bluetooth, Bluetooth high speed, and Bluetooth Low Energy (BLE), has been released, there has been a growing interest in the BLE technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method for establishing a plurality of communication links between devices and efficiently and easily communicating data between the devices through the communication links, and a device using the communication method. A device according to an embodiment of the present disclosure may use one of the communication links as a control channel and another communication link as a data transmission channel.

Another aspect of the present disclosure is to provide a device that externally broadcasts advertisement information including identifier information and capability information using a plurality of communication methods, and when there is a response to at least one of the communication methods, switches the communication units corresponding to the other communication methods, except for the responded communication method, to an inactive state.

In accordance with an aspect of the present disclosure, a communication method used by a first device that communicates with a second device is provided. The communication method includes detecting an occurrence of a predetermined event related to a device scan, scanning the second device that provides identifier information and capability information through a plurality of communication methods based on the occurrence of the predetermined event, establishing a first communication link with the scanned second device by using a first communication method from among the plurality of communication methods, determining a second communication method for communicating data with the second device via the first communication link, and establishing a second communication link with the second device by using the determined second communication method.

In accordance with an aspect of the present disclosure, the detecting of the occurrence of the predetermined event may include detecting at least one of an event of unlocking a lock screen, an event of executing a preset application, and an event of selecting a preset button.

In accordance with an aspect of the present disclosure, in the detecting of the occurrence of the predetermined event, the predetermined event may be detected based on at least one of magnetic field information obtained through a magnetic sensor, color information obtained through a Red, Green, Blue (RGB) sensor, and sound information obtained through a microphone.

In accordance with an aspect of the present disclosure, the detecting of the second device may include switching a communication unit in an inactive state to an active state based on the occurrence of the predetermined event, and receiving from the second device the identifier information and the capability information through the communication unit that is switched to the active state.

In accordance with an aspect of the present disclosure, the detecting of the second device may include switching a plurality of communication units in an inactive state to an active state based on the occurrence of the predetermined event, and receiving from the second device the identifier information and the capability information through the plurality of communication units that are switched to the active state.

In accordance with an aspect of the present disclosure, the establishing of the first communication link may include determining the first communication method from among the plurality of communication methods based on at least one of power consumption amount information and latency information, and transmitting at least one of the identifier information, the capability information, and information about a preferred communication method to the second device through the determined first communication method.

In accordance with an aspect of the present disclosure, the determining of the second communication method may include selecting the second communication method based on the capability information received from the second device, and transmitting a connection request or a negotiation request regarding the selected second communication method to the second device via the first communication link.

In accordance with an aspect of the present disclosure, the selecting of the second communication method may include receiving from the second device at least one of information about a state of the second device and information about a preferred communication method, and selecting the second communication method by considering at least one of the information about a state of the second device and the information about a preferred communication method.

In accordance with an aspect of the present disclosure, the method may further include transmitting data to the second device via the second communication link, and determining at least one of whether to terminate the second communication link and whether to maintain the first communication link when the data transmission is completed.

In accordance with an aspect of the present disclosure, the method may further include receiving a request for establishing the terminated second communication link from the second device via the first communication link, and reestablishing the second communication link in response to the request.

In accordance with an aspect of the present disclosure, the method may further include detecting an occurrence of an error in the second communication link, and re-determining the second communication method for communicating data with the second device via the first communication link.

In accordance with an aspect of the present disclosure, the plurality of communication methods may include at least two of a Bluetooth Low Energy (BLE) communication method, an ANT+ communication method, a Near Field Communication (NFC) method, a sound communication method, a ZigBee communication method, a two-dimensional barcode method, and a touch code communication method, the first communication method comprises at least one of the BLE communication method, the ANT+ communication method, the NFC method, the sound communication method, and the ZigBee communication method, and the second communication method comprises at least one of a Bluetooth communication method, a Wi-Fi communication method, a UWB communication method, and a mobile communication network.

In accordance with another aspect of the present disclosure, a first device is provided. The first device includes a sensing unit configured to detect an occurrence of a predetermined event related to a device scan, a communication unit configured to scan a second device that that provides identifier information and capability information through a plurality of communication methods based on the occurrence of the predetermined event, and a control unit configured to establish a first communication link with the scanned second device by using a first communication method among the plurality of communication methods, to determine a second communication method for communicating data with the second device, via the first communication link, and to establish a second communication link with the second device by using the determined second communication method.

In accordance with another aspect of the present disclosure, the control unit may determine the first communication method among the plurality of communication methods based on at least one of power consumption amount information and latency information.

In accordance with another aspect of the present disclosure, the control unit may select the second communication method based on the capability information received from the second device, and the communication unit may transmit a connection request or a negotiation request regarding the selected second communication method to the second device via the first communication link.

In accordance with another aspect of the present disclosure, the communication unit may transmit data to the second device via the second communication link, and the control unit determines at least one of whether to terminate the second communication link and whether to maintain the first communication link when the data transmission is completed.

In accordance with another aspect of the present disclosure, the control unit may detect occurrence of an error in the second communication link and re-determines the second communication method for communicating data with the second device via the first communication link.

In accordance with another aspect of the present disclosure, a communication method used by a second device that communicates with a first device is provided. The communication method includes broadcasting advertisement information including identifier information and capability information through a plurality of communication methods, receiving a response to the advertisement information from the first device through the first communication method from among the plurality of communication methods, establishing a first communication link with the first device by using the first communication method, determining a second communication method for communicating data with the first device via the first communication link, and establishing a second communication link with the first device by using the determined second communication method.

In accordance with another aspect of the present disclosure, the broadcasting of the advertisement information may include determining the plurality of communication methods to broadcast the advertisement information.

In accordance with another aspect of the present disclosure, the advertisement information may further include information about a state of the second device and information about a preferred communication method.

In accordance with another aspect of the present disclosure, the method may further include detecting an occurrence of an error in the second communication link, and requesting a change of the second communication link from the first device via the first communication link.

In accordance with another aspect of the present disclosure, the receiving of the response may include switching to an inactive state the other communication units except for the first communication unit corresponding to the first communication method from among a plurality of communication units that respectively correspond to the plurality of communication methods.

In accordance with another aspect of the present disclosure, the broadcasting of the advertisement information may include detecting an occurrence of a predetermined event, switching a plurality of communication units in an inactive state to an active state based on the occurrence of the predetermined event, and broadcasting the advertisement information through the plurality of communication units that are switched to an active state.

In accordance with another aspect of the present disclosure, a communication method used by a second device that communicates with a first device is provided. The communication method includes broadcasting advertisement information including identifier information and capability information through a plurality of communication methods, receiving a response to the advertisement information from the first device through the first communication method from among the plurality of communication methods, and switching to an inactive state the other communication units except for the first communication unit corresponding to the first communication method from among a plurality of communication units that respectively correspond to the plurality of communication methods.

In accordance with another aspect of the present disclosure, a second device is provided. The second device includes a communication unit configured to broadcast advertisement information including identifier information and capability information through a plurality of communication methods and to receive a response to the advertisement information from the first device through the first communication method among the plurality of communication methods, and a control unit configured to establish a first communication link with the first device by using the first communication method, to determine a second communication method for communicating data with the first device via the first communication link, and to establish a second communication link with the first device by using the determined second communication method.

In accordance with another aspect of the present disclosure, a second device is provided. The second device includes a communication unit configured to broadcast advertisement information including identifier information and capability information through a plurality of communication methods and to receive a response to the advertisement information from the first device through the first communication method from among the plurality of communication methods, and a control unit configured to switch to an inactive state the other communication units except for the first communication unit corresponding to the first communication method from among a plurality of communication units that respectively correspond to the plurality of communication methods.

In accordance with another aspect of the present disclosure, a computer readable recording medium having recorded thereon a program for executing the above method is provided.

In accordance with another aspect of the present disclosure, a method of operating an electronic apparatus is provided. The method includes monitoring at least one of physical states outside the electronic apparatus, which is performed by the electronic apparatus, determining whether a monitored physical state satisfies a selected condition, which is performed by the electronic apparatus, and discovering other electronic apparatuses outside the electronic apparatus based on at least a part of the physical state satisfying the selected condition, which is performed by the electronic apparatus.

In accordance with another aspect of the present disclosure, the monitoring of at least one of physical states outside the electronic apparatus, at least one of a sensor and an antenna of the electronic apparatus may be used.

In accordance with another aspect of the present disclosure, the monitoring of at least one of physical states outside the electronic apparatus, at least one of a microphone, an optical sensor, a geomagnetic sensor, and an antenna of the electronic apparatus may be used.

In accordance with another aspect of the present disclosure, the determining of whether a monitored physical state satisfies a selected condition may include determining whether a value indicating the monitored physical state is greater than or equal to or exceeds a threshold.

In accordance with another aspect of the present disclosure, the determining of whether a monitored physical state satisfies a selected condition may include determining whether a state in which a value indicating the monitored physical state is greater than or equal to or exceeds a threshold is maintained for more than a selected time.

In accordance with another aspect of the present disclosure, the discovering of other electronic apparatuses outside the electronic apparatus, a first communication module using a first communication method may be used.

In accordance with another aspect of the present disclosure, the first communication method may include at least one of BLE, Ant+, sound, NFC, and Zigbee.

In accordance with another aspect of the present disclosure, the method may further include, after the discovering other electronic apparatuses outside the electronic apparatus, establishing a communication link by using a second communication module using a second communication method, which is performed by the electronic apparatus.

In accordance with another aspect of the present disclosure, the second communication method may include at least one of Wi-Fi, Bluetooth, UWB, and mobile communication.

In accordance with another aspect of the present disclosure, a method of operating an electronic apparatus is provided. The method includes generating a change of a physical state outside the electronic apparatus, which is performed by the electronic apparatus, transmitting information used for discovery of the electronic apparatus by using a first communication module using a first communication method, which is performed by the electronic apparatus, and establishing a communication link by using a second communication module using a second communication method, which is performed by the electronic apparatus.

In accordance with another aspect of the present disclosure, the generating of a change of a physical state, at least one of an output device and an antenna of the electronic apparatus may be used.

In accordance with another aspect of the present disclosure, the generating of a change of a physical state, at least one of a display, a Light Emitting Diode (LED), a speaker, an electromagnet, and an antenna of the electronic apparatus may be used.

In accordance with another aspect of the present disclosure, the method may further include detecting at least one of an event of unlocking a lock screen, an event of executing a preset application, and an event of selecting a preset button, wherein the generating of a change of a physical state outside the electronic apparatus is triggered in response to at least a part of the detecting of at least one event.

In accordance with another aspect of the present disclosure, the first communication method may include at least one of BLE, Ant+, sound, NFC, and Zigbee.

In accordance with another aspect of the present disclosure, the second communication method may include at least one of Wi-Fi, Bluetooth, UWB, and mobile communication.

In accordance with another aspect of the present disclosure, an electronic apparatus is provided. The electronic apparatus includes at least one sensor, at least one antenna, and at least one processor, wherein the at least one processor is configured to monitor at least one of physical states outside the electronic apparatus by using at least one of the sensor and the antenna, to determine whether a monitored physical state satisfies a selected condition, and to discover other electronic apparatuses outside the electronic apparatus based on at least a part of the physical state satisfying the selected condition.

In accordance with another aspect of the present disclosure, a communication method for communication between a first device and a second device is provided. The method includes scanning, upon detection of a predetermined event, for at least one of identifier information and capability information being provided by the second device, establishing a first communication link with the scanned second device by using a first communication technology from among a plurality of communication technologies, determining a common communication technology by which data is to be communicated between the first device and the scanned second device as a second communication technology, and establishing a second communication link with the scanned second device by using the second communication technology.

In accordance with another aspect of the present disclosure, the predetermined event may be based on at least one of user input from the user of the first device, and automatic detection of the second device within proximity of the first device.

In accordance with another aspect of the present disclosure, the scanning for the at least one of the identifier and the capability information provided by the second device may include sequentially activating one of the communication technologies, scanning for the at least one of the identifier and the capability information, and deactivating the one of the communication technologies, until the earlier of the at least one of the identifier and the capability information is received and all of the communication technologies have been activated, used for scanning, and deactivated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 21 is a flowchart for explaining a method of determining a second communication method through a Bluetooth Low Energy (BLE) communication according to an embodiment of the present disclosure;

FIG. 26 is a flowchart for explaining a communication method used by a second device according to an embodiment of the present disclosure;

FIGS. 27 and 28 are block diagrams schematically illustrating a structure of a first device according to an embodiment of the present disclosure;

Throughout the drawings, it should be noted that like reference numbers are used to depict the same or similar elements, features, and structures.

DETAILED DESCRIPTION

Figure 1:
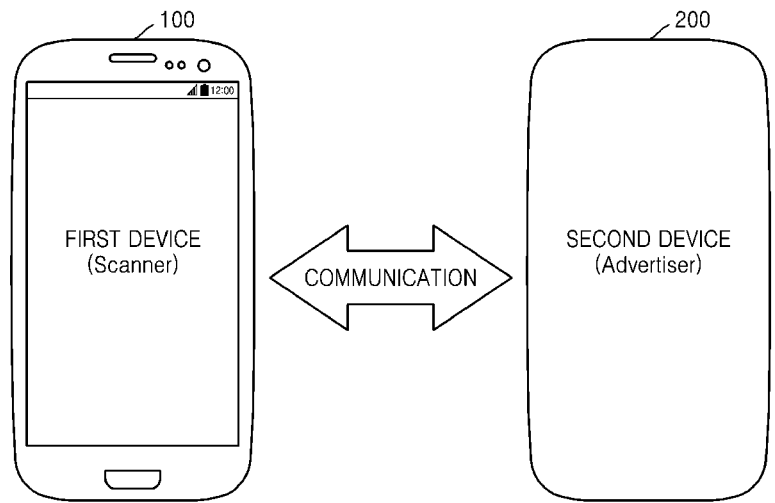
FIG. 1 is a view schematically illustrating a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein including technical or scientific terms have the same meanings as those generally understood by those of ordinary skill in the art to which the present inventive concept may pertain. Terms as those defined in generally used dictionaries are construed to have meanings according to the context of the related technology, and unless clearly defined otherwise, are not construed to be ideally or excessively formal.

When a part may "include" a certain constituent element, unless specified otherwise, it may not be construed to exclude another constituent element but may be construed to further include other constituent elements. Terms such as "~portion", "~unit", "~module", and "~block" stated in the specification may signify a unit to process at least one function or operation and the unit may be embodied by hardware, software, or a combination of hardware and software.

Throughout the present specification, a short range communication solution may include at least one of Wi-Fi, Bluetooth, ZigBee, Wi-Fi Direct (WFD), Ultra WideBand (UWB), Infrared Data Association (IrDA), Bluetooth Low Energy (BLE), Near Field Communication (NFC), Ant+, and the like. However, various embodiments of the present disclosure are not limited thereto.

Wi-Fi may include an infrastructure mode in which an Access Point (AP) for transceiving wireless signals communicates data with a plurality of terminals existing in a predetermined range, and an adhoc mode in which data is exchanged in a peer-to-peer (P2P) form between terminals without an AP.

Bluetooth is a standard for short range, low power wireless communication between wireless communication devices.

Ultra WideBand (UWB) is a low power, short distance wireless technology for transmitting a large amount of digital data through a wide spectrum frequency.

WFD is a new version of Wi-Fi technology which enables directional communication between devices. For example, according to WFD, although there is no hotspot, router, or AP, if the devices use WFD, the devices may communicate with each other and thus may share information therebetween. In other words, devices communicating using WFD may not require a hotspot, router, or AP.

ZigBee is one of Institute of Electrical and Electronics Engineers (IEEE) 802.15.4 standards supporting short range communication. ZigBee is a technology for ubiquitous computing and short range communication within 10-20 m in a wireless networking field (e.g., at home, office, or the like).

BLE refers to a core function of Bluetooth v. 4.0 that is one of the short range communication technologies. BLE has a relatively small duty cycle compared to a classic Bluetooth specification and may be produced at low costs and may operate for several years with only a coin-sized battery due to reduced mean power and standby power.

NFC, which is a form of Radio Frequency ID (RFID) or electronic tag, refers to a non-contact short range wireless communication using a frequency band of 13.56 MHz. NFC enables data communication between devices at a distance of 10 cm through a short range wireless communication technology. NFC may include a P2P mode, a Reader/Writer (R/W) mode, and a card emulation mode.

Ant+ signifies a wireless communication technology with low power consumption and for short range by using a frequency band of 2.4 GHz.

The attached drawings for illustrating various embodiments of the present disclosure are referred to in order to gain a sufficient understanding of the present disclosure, the merits thereof, and the objectives accomplished by the implementation of the present disclosure. Hereinafter, the present disclosure will be described in detail by explaining various embodiments of the disclosure with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a view schematically illustrating a communication system according to an embodiment of the present disclosure.

Referring to FIG. 1, the communication system may include a first device 100 and a second device 200. In the present specification, the first device 100 may be a device for scanning an external device and the second device 200 may be a device for advertising identifier information of the second device 200. The first device 100 and the second device 200 are respectively described below.

The first device 100 may include at least two communication units for communicating with an external device. For example, the first device 100 may include a short range communication unit, a mobile communication unit, for example, 2G, 3G, 4G, and/or the like, a microphone, a sound output unit, and/or the like. However, various embodiments of the present disclosure are not limited thereto. The short range communication unit may be, for example, a Bluetooth communication unit, a BLE communication unit, a NFC/RFID unit, a Wi-Fi (WLAN) communication unit, a ZigBee communication unit, an IrDA communication unit, a WFD communication unit, an UWB communication unit, an Ant+ communication unit, and/or the like.

The first device 100 according to the present embodiment may scan the second device 200 by using at least one of the above communication units. In other words, the first device 100 may receive a signal transmitted by the second device 200 and analyze a received signal, thereby scanning the second device 200.

For example, the first device 100 according to various embodiments of the present disclosure may recognize a sound signal transmitted by the second device 200, through the microphone. The first device 100 may decode a sound signal and may check (e.g., determine) identification information of the second device 200 and capability information about a supported communication method.

The first device 100 according to various embodiments of the present disclosure may automatically scan an external device when a predetermined event occurs, for example, when a lock screen is unlocked or magnetic field information surpasses reference magnetic field information, even when there is no separate request by a user regarding an external device scan.

The first device 100 according to various embodiments of the present disclosure may include a magnetic sensor or magnetometer. A magnetic sensor according to the various embodiments of the present disclosure may include three sensors, provided along X, Y, and Z axes, for measuring the magnitude of a magnetic field. The magnetic sensor may measure the direction of a magnetic field, the magnitude (B) of the magnetic field, and a magnetic force as the sum of output vectors of X, Y, and Z axes sensors.

Accordingly, when the first device 100 approaches a magnetic substance, the first device 100 according to various embodiments of the present disclosure may obtain information about a change in a magnetic field, the magnitude of the magnetic field, the direction of the magnetic field, a magnetic force, and/or the like, through the magnetic sensor.

Throughout the present specification, a "magnetic substance" signifies a material that is magnetized in a magnetic field. A magnetic substance may include a ferromagnetic substance, a paramagnetic substance, an antiferromagnetic substance, a ferrimagnetic substance, and/or the like. A device including a magnetic substance may be a speaker, a Magnetic Resonance Imaging (MRI) apparatus, a mobile phone, and/or the like. The following description mainly focuses on a wireless speaker and a mobile phone as examples. However, various embodiments of the present disclosure are not limited thereto.

The first device 100 according to various embodiments of the present disclosure may be embodied in a variety of forms. For example, the first device 100 according to various embodiments of the present disclosure may be an electronic device.

In the first device 100 according to various embodiments of the present disclosure, a Seamless Sensing Platform (SSP) may be operated separately from an Application Processor (AP). The first device 100 may collect sensing information and recognize a situation without waking up the AP in a sleep mode by connecting the sensing unit to a sensor hub (not shown) of the SSP. The SSP may wake up the AP in a sleep mode when a predetermined event occurs. The SSP will be described below in detail with reference to FIG. 29.

The second device 200 may advertise identifier information of the second device 200 and capability information about a communication method supported by the second device 200 through a plurality of communication methods. The communication methods may include a BLE communication method, an ANT+ communication method, an NFC method, a sound communication method, a ZigBee communication method, a two-dimensional barcode method, for example, a Quick Response (QR) code, a touch code method, and/or the like. However, various embodiments of the present disclosure are not limited thereto.

The sound communication according to various embodiments of the present disclosure signifies a communication method for transmitting and receiving data using sound. For example, the second device 200 may broadcast data (e.g., to the outside) by embedding the data in sound in an inaudible range, music, announcement broadcasting, and/or the like.

The two-dimensional barcode according to various embodiments of the present disclosure signifies a two-dimensional (matrix) code that includes various information in a rectangular pattern. A QR code may be an example of the two-dimensional barcode.

In addition, the touch code according to various embodiments of the present disclosure is a code that is formed by inserting a thin layer in a sheet of paper so as to be recognized by a touch screen. When a touch code paper contacts a touch screen, the touch screen may recognize the data included in the touch code.

The second device 200 according to various embodiments of the present disclosure may be variously provided. For example, the second device 200 may be an electronic device.

The second device 200 according to various embodiments of the present disclosure may include a magnetic substance. According to various embodiments of the present disclosure, the magnetic substance may be provided inside the second device 200 or outside the second device 200 (e.g., in a form of a dongle, an accessory, and/or the like).

The second device 200 may include a short range communication unit such as a Bluetooth communication unit, a BLE communication unit, an NFC/RFID unit, a WLAN communication unit, a ZigBee communication unit, an IrDA communication unit, a WFD communication unit, an UWB communication unit, an Ant+ communication unit, and/or the like, a mobile communication unit such as 2G, 3G, 4G, and/or the like, a sound output unit, a microphone, a display unit, and/or the like. However, various embodiments of the present disclosure are not limited thereto.

The process of advertising identifier information by the second device 200 through a plurality of communication methods will be described below in detail with reference to FIGS. 2 and 3.

Figure 2:
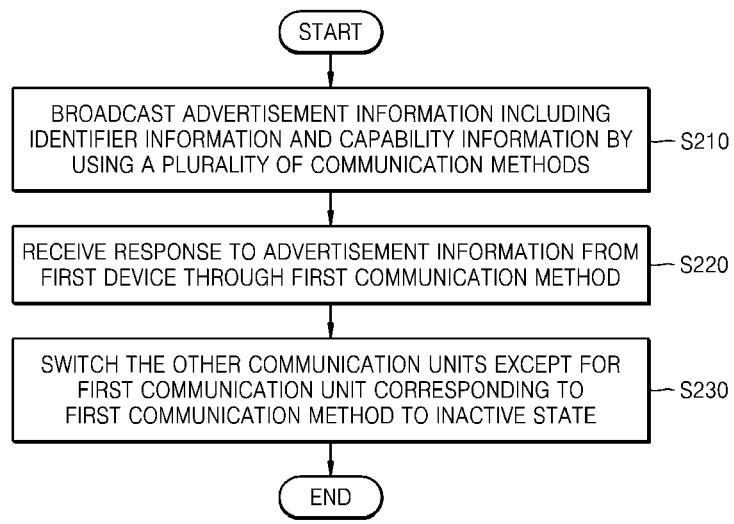
FIG. 2 is a flowchart for explaining a communication method used by a second device according to an embodiment of the present disclosure.

FIG. 2 is a flowchart for explaining a communication method used by a second device according to an embodiment of the present disclosure.

Referring to FIG. 2, in operation S210, the second device 200 may broadcast advertisement information including identifier information and capability information by using a plurality of communication methods. The second device 200 may broadcast advertisement information through a plurality of communication methods because the communication function supported by the first device 100 is unknown. The broadcast may correspond to providing data to the outside (e.g., to a surrounding environment). In other words, the broadcast may include providing, transmitting, displaying, and outputting data.

As described above, the communication methods may include the BLE communication method, the ANT+ communication method, the NFC method, the sound communication method, the ZigBee communication method, the two-dimensional barcode method, for example, a QR code, the touch code method, and/or the like. However, various embodiments of the present disclosure are not limited thereto.

The advertisement information according to various embodiments of the present disclosure may be broadcasted in a form of an advertising packet through the communication methods. The advertisement information according to various embodiments of the present disclosure may include at least one of identifier information of the second device 200, capability information of the second device 200, state information of the second device 200, and information about a preferred communication method of the second device 200.

The identifier information according to various embodiments of the present disclosure may be unique information to identify the second device 200 and may include, for example, a Media Access Control (MAC) address, a device IDentifier (ID), a device name, a product serial number, a nick name, and/or the like.

The capability information according to various embodiments of the present disclosure relates to a function supported by the second device 200 and may include, for example, information about supported communication methods such as BLE, Bluetooth, NFC, Wi-Fi, and/or the like, information about a mounted sensor such as a magnetic sensor, an accelerometer sensor, a temperature sensor, a gyroscope sensor, a proximity sensor, and/or the like, and information about available services, such as, Universal Plug and Play (UPnP), Digital Living Network Alliance (DLNA), and/or the like. However, various embodiments of the present disclosure are not limited thereto.

The state information according to various embodiments of the present disclosure is information indicating a current state of the second device 200 and may include, for example, information about an active or inactive state of a communication unit, information about an active or inactive state of a sensor, and information about a mode set on the second device 200, such as, a lock mode, an operation mode, a vibration mode, an automatic screen rotation mode, a sync mode, and/or the like. However, various embodiments of the present disclosure are not limited thereto.

The information about a preferred communication method according to various embodiments of the present disclosure may signify information about a priority of the preferred communication method in the second device 200.

The second device 200 according to various embodiments of the present disclosure may simultaneously broadcast the same advertisement information through the communication methods. For example, the second device 200 may broadcast advertisement information including identifier information and capability information in the form of an advertising packet (e.g., to the outside environment) by simultaneously using the BLE communication method, the NFC method, and the sound communication method. When the second device 200 includes the display unit, the second device 200 may generate the identifier information and capability information included in the advertisement information as a QR code, and may display the QR code on a screen.

The second device 200 according to various embodiments of the present disclosure may sequentially broadcast advertisement information through the communication methods. The second device 200 according to various embodiments of the present disclosure may sequentially broadcast advertisement information according to a predetermined order. The predetermined order may be set by a user or a system and may be changed by the user or the system.

According to various embodiments of the present disclosure, the predetermined order may be set in the order from a communication method having the least power consumption or the shortest latency. The latency signifies a delay time in communicating signals between a sender and a receiver. For example, the second device 200 may determine the order of a communication method for broadcasting advertisement information (e.g., to the outside environment) in the order of the BLE communication method, the ANT+ communication method, the NFC method, the sound communication method, and the QR code.

According to various embodiments of the present disclosure, the second device 200 may broadcast advertisement information at a predetermined cycle by using the communication methods. In addition, the second device 200 according to various embodiments of the present disclosure may encrypt the advertisement information using a predetermined encryption code and may broadcast the encrypted advertisement information to the outside (e.g., to the external environment).

In operation S220, the second device 200 may receive a response to the advertisement information from the first device 100 through a first communication method. For example, the second device 200 may receive advertisement information including the identifier information of the first device 100, the capability information of the first device 100, and the information about a preferred communication method of the first device 100, or a connection request or a negotiation request, from the first device 100 through the first communication method.

In this case, the second device 200 may establish a first communication link with the first device 100 by using the first communication method. The establishment of the first communication link may signify a state in which the first device 100 and the second device 200 may communicate data through the first communication method.

The first communication method according to various embodiments of the present disclosure may be at least one of the BLE communication method, the ANT+ communication method, the NFC method, the ZigBee communication method, and the sound communication method, and the like. However, various embodiments of the present disclosure are not limited thereto. For example, the first communication method may be a Bluetooth or Wi-Fi communication method. The first communication method will be described below in detail with reference to FIGS. 24A and 24B.

In operation S230, the second device 200 may switch the other communication units except for the first communication unit corresponding to the first communication method to an inactive state. In other words, when the second device 200 receives a response from the first device 100 through the first communication method, the second device 200 may switch the other communication units except for the first communication unit to an inactive state, thereby reducing an amount of power consumption.

For example, when a response from the first device 100 is received through the BLE communication method while the second device 200 broadcasts adverting information including the identifier information and the capability information through the BLE communication method, the NFC method, the Ant+ communication method, and the QR code, the second device 200 may switch an NFC unit, an Ant+ communication unit, and the display unit displaying a QR code, except for the BLE communication unit, to an inactive state.

Operation S230 may be omitted according to various embodiments of the present disclosure. The advertisement information that is broadcasted by the second device 200 will be described in detail with reference to FIG. 3.

Figure 3:
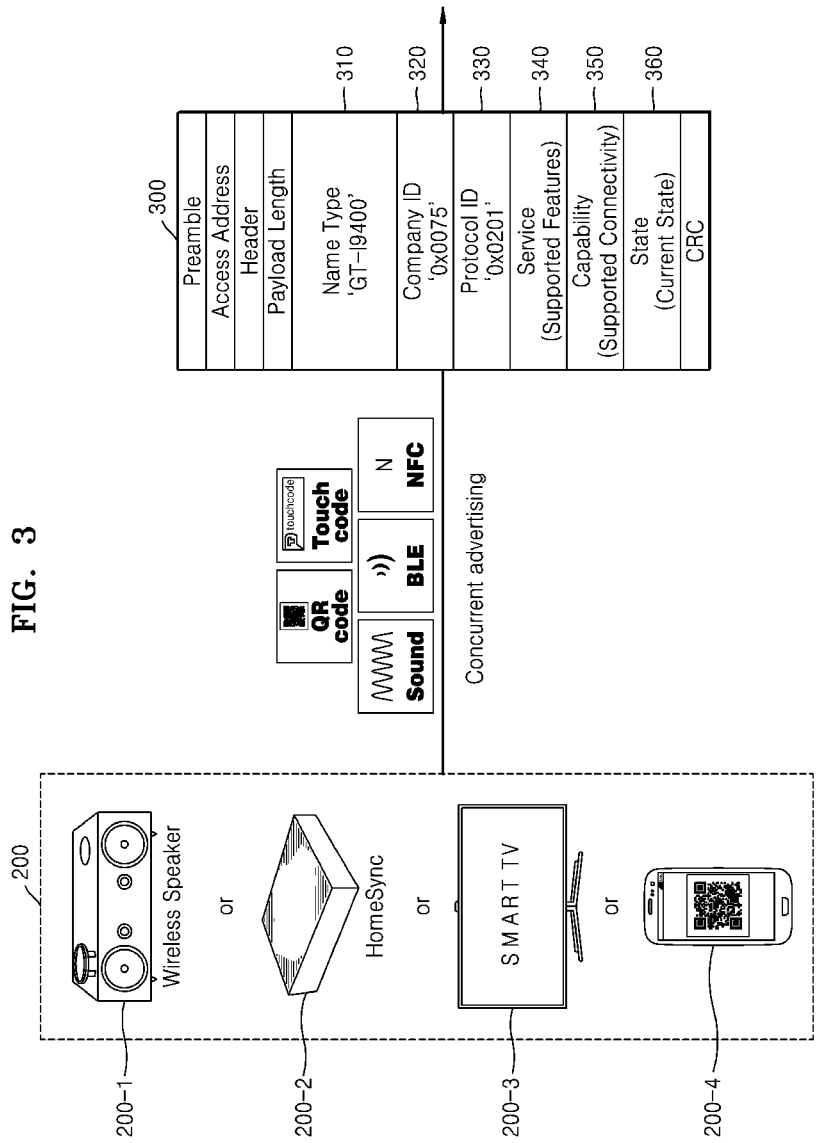
FIG. 3 is a view schematically illustrating that a second device broadcasts advertisement information through a plurality of communication methods according to an embodiment of the present disclosure.

FIG. 3 is a view schematically illustrating that a second device broadcasts advertisement information through a plurality of communication methods according to an embodiment of the present disclosure.

Referring to FIG. 3, the second device 200 according to various embodiments of the present disclosure may broadcast advertisement information through a plurality of communication methods because the communication method supported by the first device 100 is unknown. For example, when the second device 200 includes a speaker and the BLE communication unit, the second device 200 may output a sound signal including advertisement information (e.g., to the outside environment) through the speaker and simultaneously process the advertisement information in the form of an advertising packet and broadcast the advertisement information (e.g., to the outside environment) through the BLE communication unit.

In addition, when the second device 200 includes a wireless communication tag (hereinafter, referred to as the NFC tag), the second device 200 may encode advertisement information in an NFC Data Exchange Format (NDEF). The second device 200 may store the advertisement information encoded in the NDEF format in the NFC tag. When the first device 100 approaches within an NFC range of the second device 200, the advertisement information stored in the NFC tag of the second device 200 may be transmitted to the first device 100.

When the second device 200 includes a display unit as in a TV 200-3 or a smartphone 200-4, the second device 200 may generate the advertisement information in a two-dimensional barcode (e.g., a QR code), and may display the generated two-dimensional barcode (e.g., a QR code), on the display unit. The second device 200 according to various embodiments of the present disclosure may transmit the advertisement information to the first device 100 through a touch code.

In other words, the second device 200 according to various embodiments of the present disclosure may transmit the advertisement information to the first device 100 by using at least two of the sound communication, the BLE communication method, the ANT+ communication method, the NFC method, the ZigBee communication method, the QR code method, and the touch code method.

A data packet 300 of the advertisement information broadcasted (e.g., to the outside environment) through a plurality of communication methods may include an identifier information field 310 (e.g., Name Type "GT-I9400"), indicating identifier information of the second device 200, a manufacturer field 320 (e.g., Company ID "0X0075"), indicating a manufacturer manufacturing the second device 200, a protocol field 330 (e.g., Protocol ID "0X0201") indicating a protocol used by the second device 200, a service field 340 indicating a service providing the second device 200, a capability field 350 indicating a communication method supported by the second device 200, and a state field 360 indicating a current state of the second device 200, and the like. However, various embodiments of the present disclosure are not limited thereto.

The communication method of the first device 100 that receives the advertisement information broadcasted by the second device 200 and responds thereto will be described in detail with reference to FIG. 4.

Figure 4:
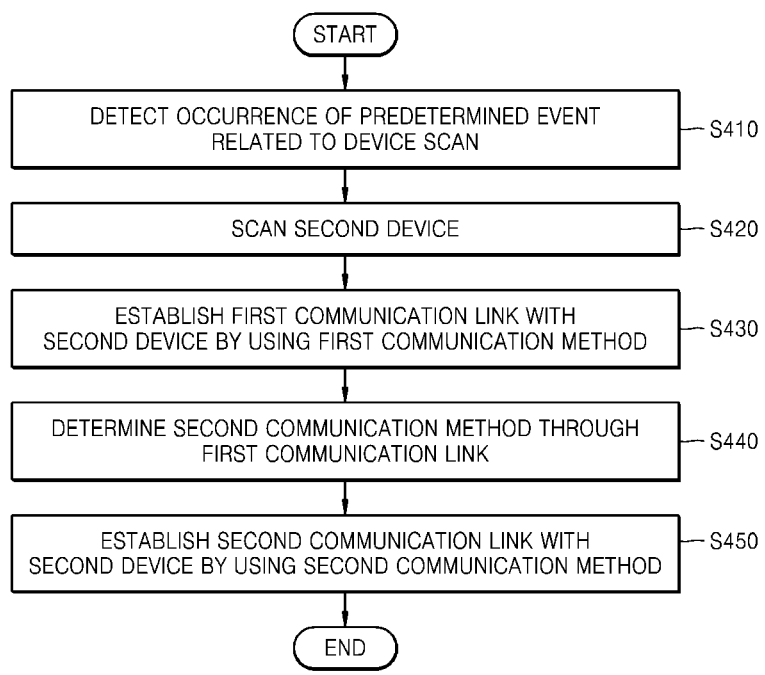
FIG. 4 is a flowchart for explaining a communication method used by a first device according to an embodiment of the present disclosure.

FIG. 4 is a flowchart for explaining a communication method of a first device according to an embodiment of the present disclosure.

Referring to FIG. 4, in operation S410, the first device 100 may detect an occurrence of a predetermined event related to a device scan. A predetermined event according to various embodiments of the present disclosure may be an event of triggering scanning of external devices.

For example, the predetermined event may be an event of unlocking a lock screen, an event of executing a preset application, an event of selecting a preset button, and/or the like. However, various embodiments of the present disclosure are not limited thereto. The preset button may be a physical button included in the first device 100 or a Graphic User Interface (GUI) button displayed on the screen of the first device 100.

The predetermined event according to various embodiments of the present disclosure may include an event in which magnetic field information obtained through a magnetic sensor is over predetermined reference magnetic field information, an event in which color information obtained through an a Red, Green, Blue (RGB) sensor matches reference color information, an event in which sound information obtained through a microphone matches reference sound information, and/or the like. A detailed description related to the predetermined event is provided below with reference to FIGS. 5 to 7 and FIGS. 16 to 20.

In operation S420, the first device 100 may scan the second device 200 that provides identifier information and capability information through a plurality of communication methods based on occurrence of a predetermined event. In other words, when a predetermined event related to a device scan occurs, the first device 100 may start scanning of the second device 200.

For example, when a predetermined event related to a device scan occurs, the first device 100 may switch a plurality of communication units in an inactive state to an active state. Then, the first device 100 may receive the identifier information and the capability information broadcasted by the second device 200, through the communication units switched to an active state.

The first device 100 according to various embodiments of the present disclosure may receive the identifier information and the capability information broadcasted by the second device 200, through the communication units. The communication units may include at least two of the BLE communication unit, the ANT+ communication unit, the NFC unit, the ZigBee communication unit, the microphone for receiving a sound signal, the camera for capturing a QR code, a touch panel for recognizing a touch code, and the like. However, various embodiments of the present disclosure are not limited thereto.

For example, when a predetermined event related to a device scan occurs, the first device 100 may switch a plurality of communication units in an inactive state to an active state and may receive the identifier information and the capability information broadcasted by the second device 200, through the communication units switched to an active state.

According to various embodiments of the present disclosure, the first device 100 may scan the second device 200 by simultaneously using the communication units or may scan the second device 200 by sequentially using the communication units.

For example, the first device 100 may switch both of the BLE communication unit and the microphone to an active state and may receive the advertisement information broadcasted by the second device 200 by simultaneously using the BLE communication unit and the microphone.

In addition, the first device 100 first scans the second device 200 by using the BLE communication unit having the least power consumption amount. If the second device 200 is not scanned through the BLE communication unit within a predetermined time (e.g., 1-2 seconds), the second device 200 may switch the microphone to an active state and then scan the second device 200 that transmits a sound signal. If a sound signal is not received through the microphone for a predetermined time (e.g., 30 seconds), the first device 100 may switch the camera to an active state and then recognize a QR code displayed on the display unit.

In operation S430, the first device 100 may establish a first communication link with the second device 200 by using the first communication method of the above communication methods. The first communication link according to various embodiments of the present disclosure may signify a channel for determining a second communication method to communicate data with the second device 200.

According to various embodiments of the present disclosure, the first device 100 may determine the first communication method in consideration of the capability information about a communication method supported by the second device 200 that is received from the second device 200. The first device 100 may determine the first communication method of the above communication methods in consideration of at least one of the information about a power consumption amount and the information about latency.

The first device 100 may transmit to the second device 200 a connection request or negotiation request in relation to the first communication method. The first device 100 may transmit to the second device 200 at least one of the identifier information, capability information, and preferred communication method information of the first device 100, by using the first communication method.

For example, when the second device 200 supports the BLE communication method, the ANT+ communication method, the NFC method, the sound communication method, the ZigBee communication method, and/or the like, the first device 100 may determine the BLE communication unit as the first communication method in consideration of the power consumption amount and latency. In this case, the first device 100 may embed the identifier information of the first device 100 (e.g., a device ID, a MAC address, a device name, and/or the like), the capability information of the first device 100 (e.g., support of BLE, Bluetooth, Ant+, Wi-Fi, and/or NFC), and the preferred communication information of the first device 100 (e.g., Bluetooth), in the advertisement information, and broadcast the advertisement information.

In addition, because the first device 100 knows the identifier information of the second device 200, the first device 100 may transmit the identifier information of the first device 100 (e.g., a device ID, a MAC address, a device name, and/or the like), the capability information of the first device 100 (e.g., support of BLE, Bluetooth, Ant+, Wi-Fi, and/or NFC), and the preferred communication information of the first device 100 (e.g., Bluetooth), directly to the second device 200 by using the BLE communication method so as to request a BLE communication connection.

When the second device 200 receives the identifier information, capability information, and preferred communication method of the first device 100 by using the BLE communication method and transmits a response message agreeing to the BLE communication method to the first device 100, the BLE communication link may be established as the first communication link. According to various embodiments of the present disclosure, the first device 100 or the second device 200 may change the first communication link to be used as a control channel through negotiation.

In operation S440, the first device 100 may determine a second communication method to communicate data with the second device 200 via the first communication link. For example, the first device 100 may select the second communication method based on at least one of capability information of the second device 200, state information of the second device 200, and information about a preferred communication method of the second device 200 which are received from the second device 200. The first device 100 may transmit a connection request or negotiation request regarding a selected second communication method to the second device 200 via the first communication link.

The second communication method according to various embodiments of the present disclosure may be at least one of the Bluetooth communication method, the WLAN communication method, the WFD communication method, the UWB communication method, a mobile communication network such as 2G, 3G, or 4G, and/or the like. However, various embodiments of the present disclosure are not limited thereto.

In operation S450, the first device 100 may establish a second communication link with the second device 200 by using the second communication method. In other words, when the second device 200 transmits a response message to agree to the second communication method selected by the first device 100 to the first device 100, the first device 100 and the second device 200 exchange connection information for establishing the second communication link (e.g., a Service Set IDentifier (SSID), an IP address, a MAC address, a channel number, a security key, a BT address, a product name, profile information, and/or the like), thereby establishing the second communication link. The establishment of the second communication link between the first device 100 and the second device 200 will be described below in detail with reference to FIG. 23.

The second communication link according to various embodiments of the present disclosure may be used as a data communication channel for communicating data. Accordingly, the first device 100 may transmit data to the second device 200 via the second communication link. For example, the first device 100 may transmit text, music, moving picture, a photo, an application, and/or the like via the second communication link.

When the use of the second communication link is completed, the first device 100 according to various embodiments of the present disclosure may terminate the second communication link. The first device 100 according to various embodiments of the present disclosure may maintain the first communication link having the least power consumption amount as the control channel. For example, when the data transmission is completed or a role as a mobile AP is completed, the first device 100 may terminate the second communication link to reduce the power consumption amount and maintain the first communication link of a low power.

Thus, when the second communication link is needed again, for example, when data to be transmitted exists or when the second device 200 needs to use the Internet again, the first device 100 and the second device 200 may quickly reestablish the second communication link by using the first communication link.

According to various embodiments of the present disclosure, the order of operations S410 to S450 may be changed and some operations may be omitted. The predetermined event related to a device scan will be described below in detail with reference to FIGS. 5 to 7.

Figure 5:
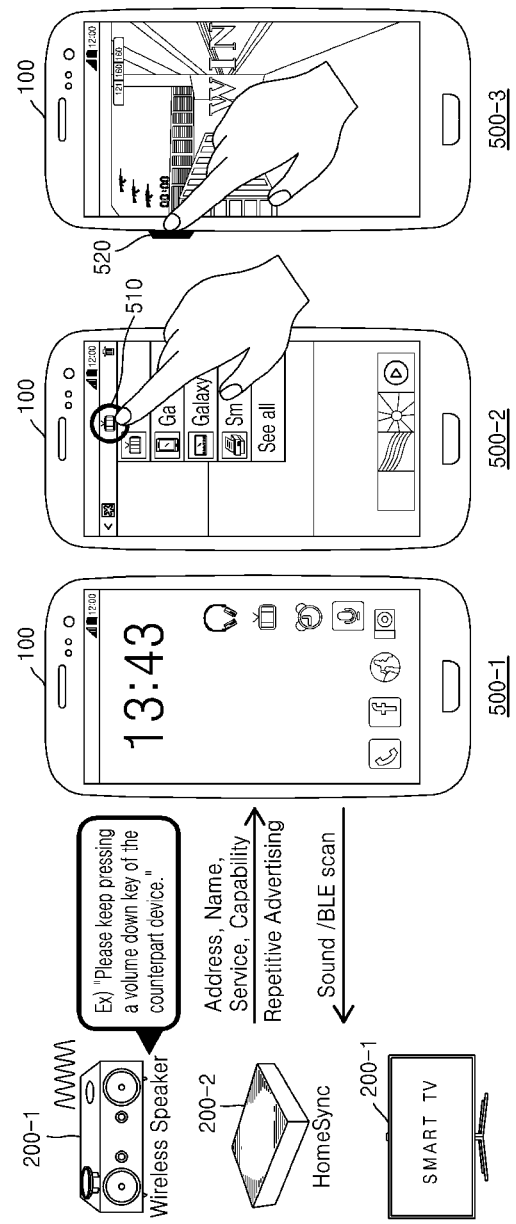
FIG. 5 is a view schematically illustrating a predetermined event related to a device scan according to an embodiment of the present disclosure.

FIG. 5 is a view schematically illustrating a predetermined event related to a device scan according to an embodiment of the present disclosure.

Referring to FIG. 5, the first device 100 is a mobile terminal and the second device 200 is a wireless speaker 200-1, a home sync 200-2, or a smart TV 200-3.

Referring to FIG. 5, the second device 200 may repeatedly broadcast the advertisement information including the identifier information (e.g., an address name) and the capability information (e.g., service, capability, and/or the like), by using a plurality of communication methods (e.g., the BLE communication method, the NFC method, the Ant+ communication method, the sound communication method, the Zigbee communication method, the QR code, and/or the like).

In particular, when the second device 200 includes a sound output unit such as the wireless speaker 200-1 and power is applied to the second device 200, the second device 200 may output a sound signal by embedding the advertisement information in an inaudible range of the sound signal including sound guide data (e.g., "Please keep pressing a volume down key of a counterpart device"). The second device 200 may broadcast the same advertisement information by using the BLE communication method, the Ant+ communication method, the NFC method, and/or the like. When the second device 200 includes the display unit like the smart TV 200-3, the second device 200 may generate a QR code corresponding to the advertisement information and display the generated QR code on the display unit.

As illustrated by a first screen 500-1, when a user unlocks a lock screen of the first device 100, the first device 100 may detect an occurrence of an event of unlocking a lock screen. If the event of unlocking a lock screen is preset as an event of triggering a device scan, the first device 100 may perform scanning of the second device 200 by using at least one of the BLE communication unit and the microphone. In addition, an event of activating a screen may be preset as the event of performing a device scan. In this case, when a user turns a screen on by pressing a home button or a power button, the first device 100 may automatically scan an external device.

An event of selecting a predetermined button may be preset as the event of triggering a device scan. The predetermined button may be a button of a GUI type displayed on the screen or a button physically attached on the first device 100.

For example, as illustrated by a second screen 500-2, the user may select a share button 510 to share a photo with the second device 200. In this case, if an event of selecting the share button 510 is preset as the event of triggering a device scan, the first device 100 may perform scanning of the second device 200 by using at least one of the BLE communication unit and the microphone.

As illustrated by a third screen 500-3, the user may select a volume control button 520. In this case, if an event of selecting the volume control button 520 is preset as the event of triggering a device scan, the first device 100 may perform scanning of the second device 200 by using at least one of the BLE communication unit and the microphone.

Although in FIG. 5 the second device 200 is scanned by using the BLE communication unit and the microphone, various embodiments of the present disclosure are not limited thereto. In other words, the first device 100 may receive advertisement information broadcasted by the second device 200 through the NFC unit, the Ant+ communication unit, the Zigbee communication unit, the camera, and/or the like.

Figure 6:
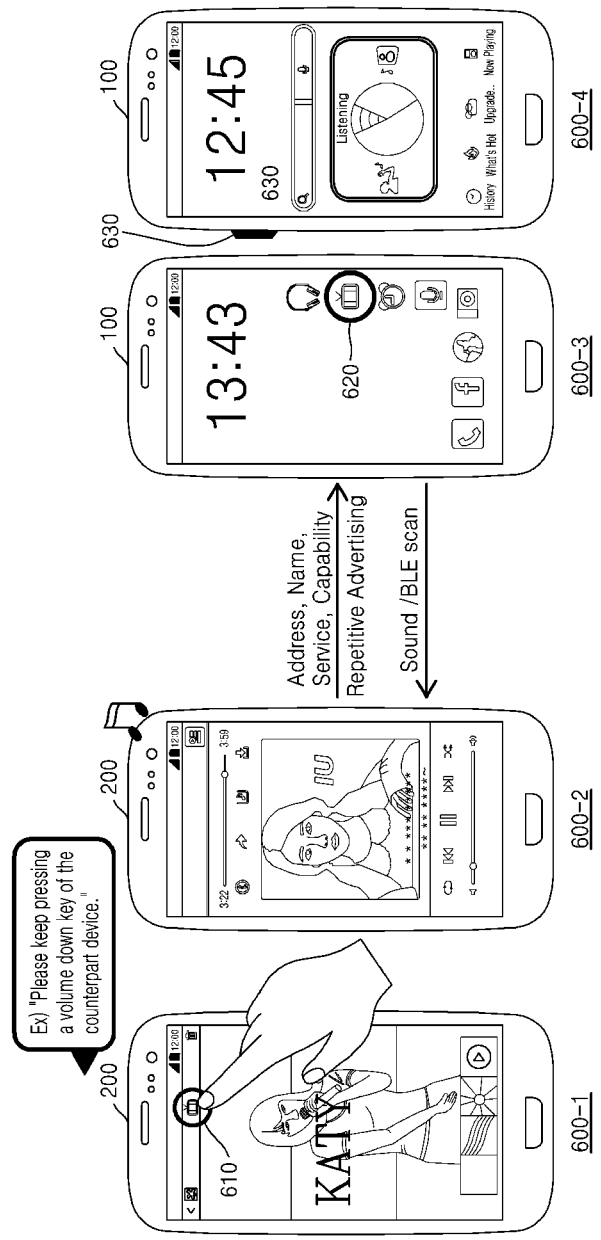
FIG. 6 is a view schematically illustrating a predetermined event related to a device scan according to an embodiment of the present disclosure.

FIG. 6 is a view schematically illustrating a predetermined event related to a device scan according to an embodiment of the present disclosure.

Referring to FIG. 6, the first device 100 and the second device 200 are, for example, mobile terminals.

As illustrated by a first screen 600-1, when a user selects a share button 610 of the second device 200 to share a photo with the first device 100, the second device 200 may output a sound signal by embedding advertisement information (e.g., address, name, service, and capability information), in an inaudible range of the sound signal including voice guidance data (e.g., "Please keep pressing a volume down key of the counterpart device"). Simultaneously, the second device 200 may repeatedly broadcast the advertisement information by using a plurality of communication methods (e.g., the BLE communication method, the NFC method, the Ant+ communication method, the Zigbee communication method, the QR code, and/or the like).

As illustrated by a second screen 600-2, when the user may reproduce music from the second device 200, the second device 200 may embed advertisement information in music and repeatedly broadcast the advertisement information through a speaker while reproducing the music. Simultaneously, the second device 200 may repeatedly broadcast the advertisement information by using a plurality of communication methods (e.g., the BLE communication method, the NFC method, the Ant+ communication method, the Zigbee communication method, the QR code, and/or the like).

According to various embodiments of the present disclosure, when a user controls the volume size of music, the second device 200 may control transmission power Tx Power to broadcast the advertisement information according to the volume size.

As illustrated by a third screen 600-3, the user of the first device 100 may select an application 620 for reproducing a moving picture. If an event of executing the application 620 for reproducing a moving picture is preset as the event of triggering a device scan, the first device 100 may perform scanning of the second device 200 by switching at least one of the BLE communication unit and the microphone to an active state.

As illustrated by a fourth screen 600-4, the user may select the volume control button 630 according to guidance voice output from the first device 100. If an event of selecting the volume control button 630 is preset as the event of triggering a device scan, the first device 100 may perform scanning of the second device 200 by switching at least one of the BLE communication unit and the microphone to an active state.

Although in FIG. 6 the second device 200 is scanned through the BLE communication unit and the microphone, the first device 100 may receive advertisement information broadcasted by the second device 200 through the NFC unit, the Ant+ communication unit, the Zigbee communication unit, the camera, and/or the like.

The occurrence of a predetermined event related to a device scan using a magnetic sensor by the first device 100 will be described below in detail with reference to FIGS. 7 to 14.

Figure 7:
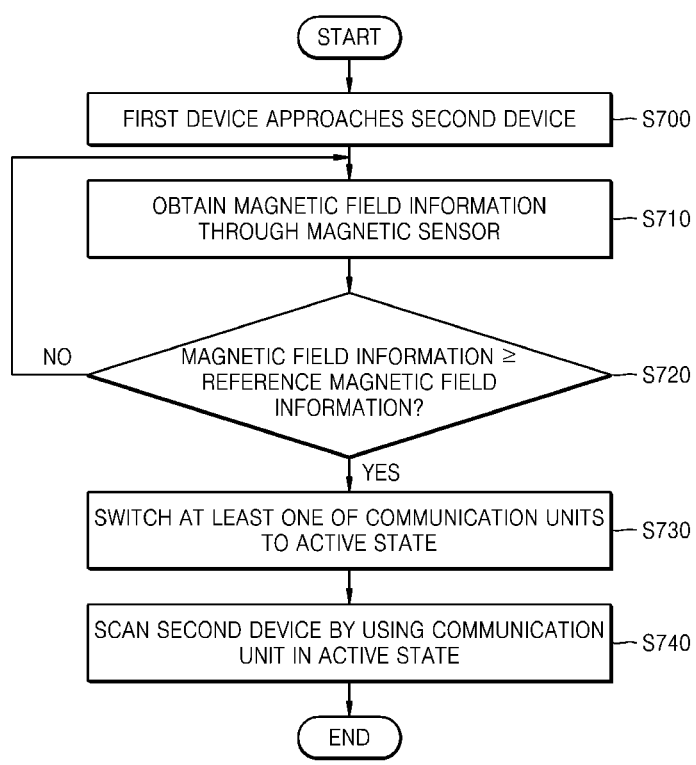
FIG. 7 is a flowchart for explaining a method of scanning a second device through a magnetic sensor according to an embodiment of the present disclosure.

FIG. 7 is a flowchart for explaining a method of scanning a second device through a magnetic sensor according to an embodiment of the present disclosure.

In operation S700, a user may have the first device 100 access to the second device 200 including a magnetic substance. For example, the first device 100 approaches the second device 200.

Thereafter, in operation S710, the first device 100 may obtain magnetic field information through a magnetic sensor.

According to various embodiments of the present disclosure, the first device 100 may directly measure magnetic field information, receive magnetic information measured by an external device (e.g., an accessory, and/or the like), or receive magnetic field information from a server. In the following description, for convenience of explanation, a case that the first device 100 directly measures magnetic field information is described.

The magnetic field information according to various embodiments of the present disclosure may be information about the direction of a magnetic field, the magnitude of the magnetic field, a magnetic force, a change in the magnetic field, a change in the magnetic force, and/or the like. However, various embodiments of the present disclosure are not limited thereto. In addition, the magnetic field information according to various embodiments of the present disclosure may be an integer value of the magnitude of the magnetic field or magnetic force, or a vector having a direction and magnitude.

The magnetic field according to various embodiments of the present disclosure may be characterized by a magnetic value along one of the X, Y, and Z axes or along two or more of the X, Y, and Z axes, or a sum of vectors along two or more of the X, Y, and Z axes. For example, the first device 100 according to various embodiments of the present disclosure may generate magnetic field information by using magnetic field values along the three axes measured by the magnetic sensor.

According to various embodiments of the present disclosure, the first device 100 may obtain magnetic field information at a predetermined cycle (e.g., 0.1 second), by using the magnetic sensor. In addition, according to various embodiments of the present disclosure, the first device 100 may obtain magnetic field information through the magnetic sensor when a movement of the first device 100 is detected. When the first device 100 is located in a preset area (e.g., a house, office, or the like) the magnetic field information may be obtained through the magnetic sensor.

When obtaining magnetic field information through the magnetic sensor, the first device 100 according to various embodiments of the present disclosure may consider angular velocity information detected by a gyroscope and acceleration information detected by an accelerometer sensor. The magnetic field information obtained through the magnetic sensor will be described below in detail with reference to FIGS. 8 to 12.

In operation S720, the first device 100 may compare the magnetic field information obtained through the magnetic sensor and predetermined reference magnetic field information. For example, the first device 100 may determine whether a value of the magnetic field information obtained through the magnetic sensor is greater than or equal to a value of the predetermined reference magnetic field information.

The reference magnetic field information according to various embodiments of the present disclosure may signify information about the magnitude of a magnetic field, a magnetic force, or a critical value that is a reference for switching a communication unit in an inactive state to an active state. For example, the reference magnetic field information may be set to 180 μT.

According to various embodiments of the present disclosure, the reference magnetic field information may be set by a user, the first device 100, or an external server. However, various embodiments of the present disclosure are not limited thereto.

The first device 100 according to various embodiments of the present disclosure may extract the reference magnetic field information from a memory (not shown) and compare the extracted reference magnetic field information with the magnetic field obtained through the magnetic sensor. According to various embodiments of the present disclosure, the sensor hub of the SSP may compare the magnetic field information obtained through the magnetic sensor with the reference magnetic field information. In this case, because an Application Processor (AP) may be in a sleep mode, the power consumed by the first device 100 may be reduced.

According to various embodiments of the present disclosure, the AP may compare the predetermined reference magnetic field information with the magnetic field obtained through the magnetic sensor. In this case, the sensor hub may be in a sleep state.

According to various embodiments of the present disclosure, when the value of the magnetic field information obtained through the magnetic sensor is less than the value of the reference magnetic field information (e.g., 180 μT), the first device 100 may continuously monitor a vicinity thereof through the magnetic sensor.

In operation S730, when the value of the magnetic field information obtained through the magnetic sensor is greater than or equal to the value of the reference magnetic field information, the first device 100 may switch at least one of the communication units to an active state.

For example, when the value of the magnetic field information obtained through the magnetic sensor (e.g., a magnitude of a magnetic field of 180-200 μT), is maintained to be greater than or equal to the value of the reference magnetic field information (e.g., a magnitude of a magnetic field of 180 μT), for a predetermined time (e.g., 2 seconds), the communication unit in an inactive state may be switched to the active state. For example, when the magnitude of a magnetic field detected by the magnetic sensor is greater than or equal to a reference magnitude as the first device 100 approaches the second device 200 including a magnetic substance, the first device 100 may switch the communication unit maintained in an inactive state to an active state.

According to various embodiments of the present disclosure, while monitoring the magnetic field information detected by the magnetic sensor, the sensor hub of the SSP may wake up the AP in a sleep mode when the value of the magnetic field information is greater than or equal to the value of the reference magnetic field information. The AP may receive from sensor hub information about the state of the first device 100 (e.g., magnetic field information, a job to be done, and/or the like). The AP may switch the communication unit in an inactive state to an active state based on the information received from the sensor hub.

Thus, the first device 100 according to various embodiments of the present disclosure may reduce standby power consumed by the communication unit by maintaining the communication unit in an inactive state in a general case. In addition, when the value of the magnetic field information detected by the magnetic sensor is greater than or equal to the value of the reference magnetic field information, the first device 100 according to various embodiments may switch the communication unit in an inactive state to an active state so that the communication unit may be automatically activated without a separate operation by the user when communication is needed.

According to various embodiments of the present disclosure, the first device 100 may switch a plurality of communication units to an active state. According to various embodiments of the present disclosure, the first device 100 may simultaneously or sequentially activate the communication units. For example, the first device 100 may simultaneously switch the BLE communication method, the NFC method, and the microphone in an inactive state to an active state, or sequentially switch the BLE communication method, the NFC method, and the microphone in such an order. The activation of the communication units by the first device 100 will be described below in detail with reference to FIGS. 15A and 15B.

In operation S740, the first device 100 may scan the second device 200 by using the communication unit switched to an active state. For example, the first device 100 may receive information broadcasted by the second device 200 through the communication unit switched to an active state. The information broadcasted by the second device 200 may include at least one of the identifier information of the second device 200 such as a device name, an ID, an identification code, state information of the second device 200, information about a communication method supported by the second device 200, and/or the like. The first device 100 according to various embodiments of the present disclosure may analyze received information to recognize the second device 200.

The magnetic field information obtained through the magnetic sensor by the first device 100 and the stored reference magnetic field information will be described below in detail with reference to FIGS. 8 to 12.

Figure 8:
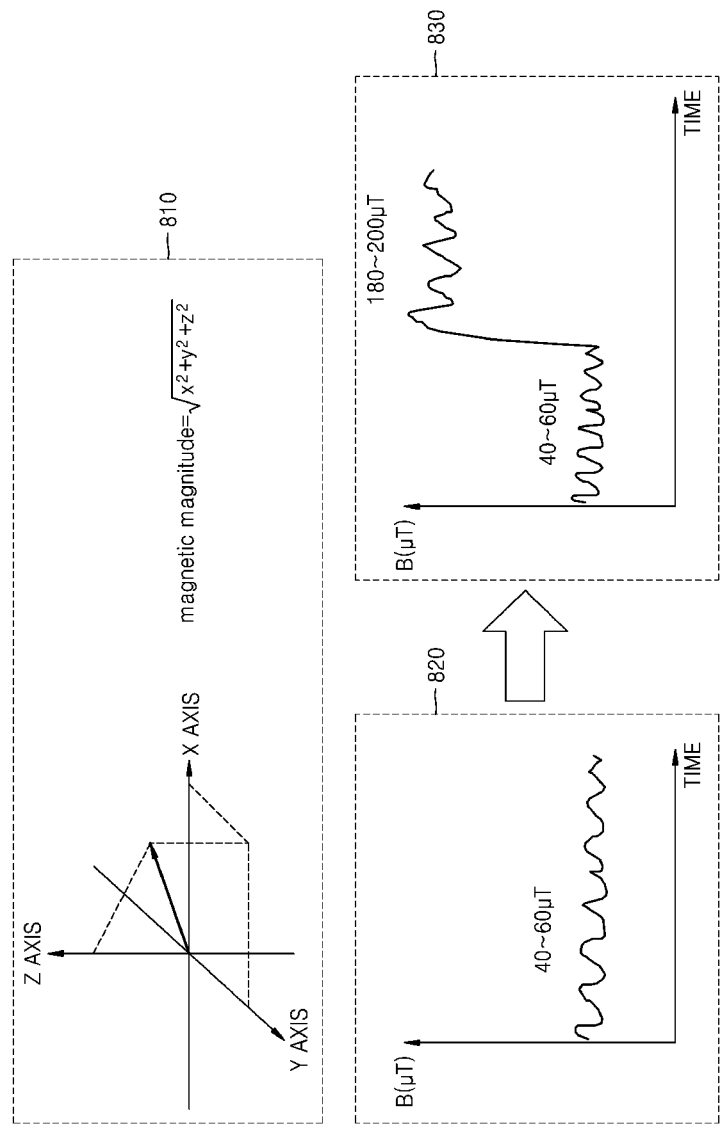
FIG. 8 is a view schematically illustrating magnetic field information according to an embodiment of the present disclosure.

FIG. 8 is a view schematically illustrating magnetic field information according to an embodiment of the present disclosure.

Referring to FIG. 8, as illustrated by a first graph 810, the first device 100 may obtain a sum of output vectors along the X, Y, and Z axes measured by the three-axis magnetic sensor (e.g., a magnetic magnitude as magnetic field information). For example, the first device 100 may calculate the sum of three vectors (e.g., $\sqrt{x^2+y^2+z^2}$), and compare the calculated value $\sqrt{x^2+y^2+z^2}$ and the reference magnetic field information (e.g., a reference magnetic magnitude).

Although in the first graph 810 the sum of three vectors (e.g., $\sqrt{x^2+y^2+z^2}$), is described as an example of magnetic field information obtained through the magnetic sensor, various embodiments of the present disclosure are not limited thereto. In other words, the magnetic field information according to various embodiments of the present disclosure may be the magnitude of one of the vectors along the X, Y, and Z axes (e.g., |X|, |Y|, and |Z|), or the sum of two vectors along the X, Y, and Z axes (e.g., $\sqrt{x^2+y^2}$, $\sqrt{x^2+z^2}$, and $\sqrt{y^2+z^2}$). In addition, the magnetic field information may be the sum of square values of each of the three vectors (e.g., $x^2+y^2+z^2$). For convenience of explanation, hereinafter, the sum of three vectors (e.g., $\sqrt{x^2+y^2+z^2}$), is used as an example of the magnetic field information.

As illustrated by a second graph 820, when a magnetic substance is spaced apart a predetermined distance from the first device 100, a magnetic magnitude (B) measured by the magnetic sensor may be 40-60 μT.

However, as illustrated by a third graph 830, when the distance between the first device 100 and the magnetic substance decreases within a predetermined distance (e.g., 10 cm), the magnetic magnitude (B) measured by the magnetic sensor may be increased to 180-200 μT from 40-60 μT.

The distance between the first device 100 and the magnetic substance at which the magnetic magnitude (B) increases may vary according to the amount of the magnetic substance. For example, when the amount of a magnetic substance is small like a speaker of a smartphone, the magnetic magnitude (B) measured by the magnetic sensor increases only when the distance between the first device 100 and the magnetic substance is reduced within 1 cm. In addition, when the second device 200 including a magnetic substance is a 70 W 5" loud speaker, the magnetic magnitude (B) measured by the magnetic sensor may increase if the distance between the first device 100 and the loud speaker is within 10 cm.

The first device 100 may compare the magnetic magnitude (absolute value) obtained through the magnetic sensor with the reference magnetic magnitude, or may compare the amount of a change in the magnetic magnitude with the reference change amount, which will be described with reference to FIG. 9.

Figure 9:
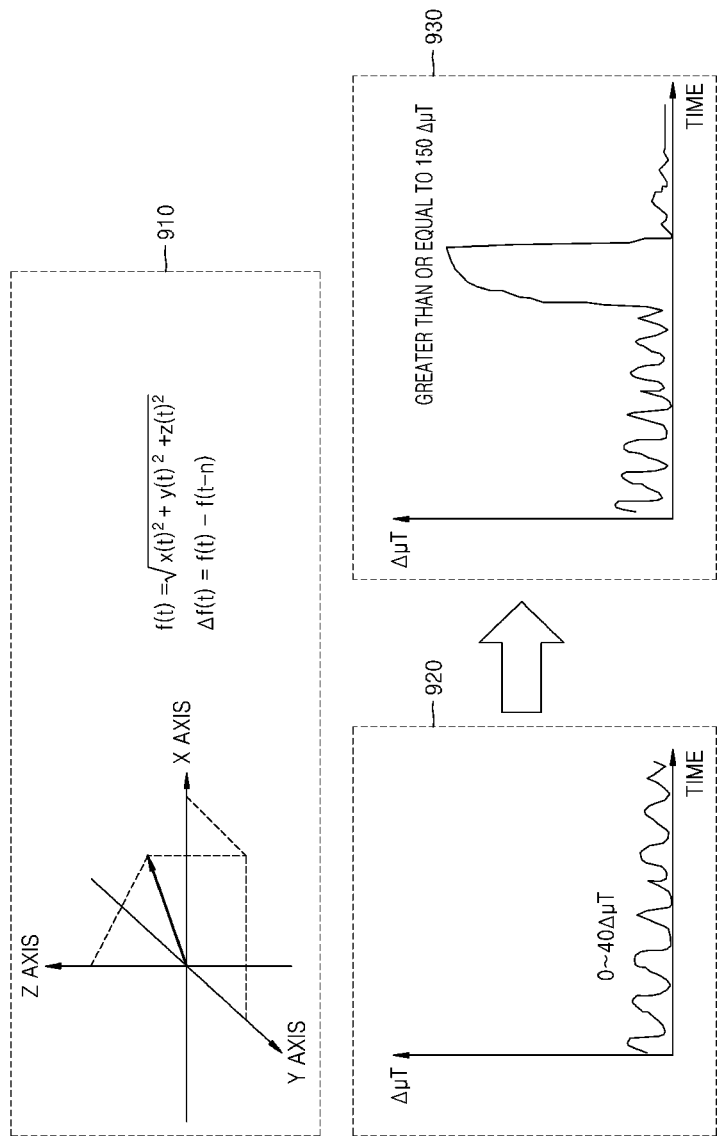
FIG. 9 is a view schematically illustrating information about an amount of change in a magnetic magnitude according to an embodiment of the present disclosure.

FIG. 9 is a view schematically illustrating information about an amount of a change in a magnetic magnitude according to an embodiment of the present disclosure.

Referring to FIG. 9, as illustrated by a first graph 910, the first device 100 may obtain an amount of a change in the sum of output vectors along the X, Y, and Z axes measured by the three-axis magnetic sensor as the magnetic field information.

For example, the first device 100 may define the magnetic magnitude at a particular time t is expressed by Equation 1 as follows.

$$f(t)=\sqrt{x(t)^2+y(t)^2+z(t)^2} \quad \text{Equation 1}$$

The amount of a change in the magnetic magnitude with respect to a particular time t is expressed by Equation 2 as follows.

$$\Delta f(t)=f(t)-f(t-n) \quad \text{Equation 2}$$

The first device 100 according to various embodiments of the present disclosure may obtain the amount of a change in the magnetic magnitude through Equations 1 and 2 and may compare the amount of a change in the magnetic magnitude with the reference magnetic field information, for example, a preset reference change amount.

As illustrated by a second graph 920, when a magnetic substance is spaced apart a predetermined distance from the first device 100, the amount of a change in the magnetic magnitude (B) measured by the magnetic sensor may be 0-40 $\Delta\mu T$. However, as illustrated by a third graph 930, when the distance between the first device 100 and the magnetic substance decreases to be within a predetermined distance (e.g., 10 cm), the magnetic magnitude (B) measured by the magnetic sensor increases from 20-30 $\mu T$ to 180-200 $\mu T$ and thus the amount of a change in the magnetic magnitude of 150-180 $\Delta\mu T$ may increase to be greater than or equal to the preset reference change amount (e.g., 150 $\Delta\mu T$).

A method of obtaining magnetic field information through a machine learning algorithm by the first device 100 will be described below in detail with reference to FIGS. 10 to 12.

Figure 10:
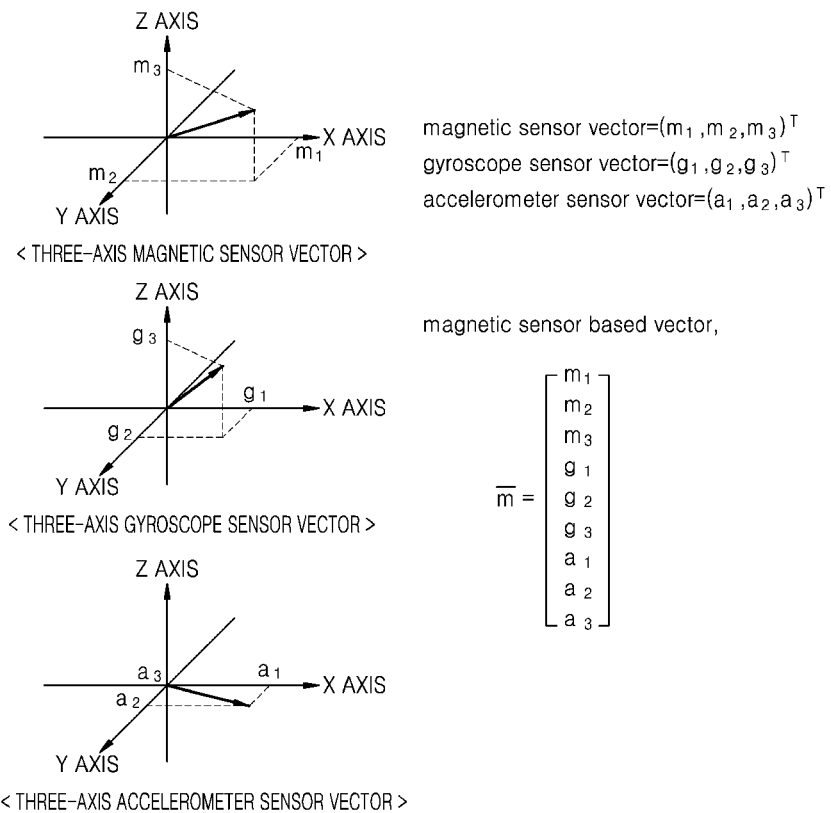
FIG. 10 is a view schematically illustrating a particular vector obtained from a plurality of sensors according to an embodiment of the present disclosure.

FIG. 10 is a view schematically illustrating a particular vector obtained from a plurality of sensors according to an embodiment of the present disclosure.

Referring to FIG. 10, in obtaining the magnetic field information through the magnetic sensor, the first device 100 according to various embodiments of the present disclosure may further consider a gyroscope sensor value and an accelerometer sensor value in addition to a magnetic sensor value. In other words, because the first device 100 may be moving while the magnetic sensor value is measured, the first device 100 may further consider the gyroscope sensor value and the accelerometer sensor value to obtain accurate magnetic field information.

As illustrated in FIG. 10, the first device 100 may obtain a first vector $[m1, m2, m3]^T$ related to a magnetic field from the three-axis magnetic sensor, a second vector $[g1, g2, g3]^T$ related to an angular velocity from a three-axis gyroscope magnetic sensor, and a third vector $[a1, a2, a3]^T$ related to acceleration from a three-axis accelerometer sensor. The first device 100 may sum the first, second, and third vectors and obtain a single particular vector $\overline{m}$ as the magnetic field information as follows.

$$\overline{m}=[m_1,m_2,m_3,g_1,g_2,g_3,a_1,a_2,a_3]^T$$

The first device 100 may determine whether a magnetic substance exists therearound by applying the particular vector $\overline{m}$ to a machine learning algorithm. However, various embodiments of the present disclosure are not limited thereto. The first device 100 may employ not only the machine learning algorithm but also other methods capable of determining whether a magnetic substance exists therearound, which will be described with reference to FIG. 11.

Figure 11:
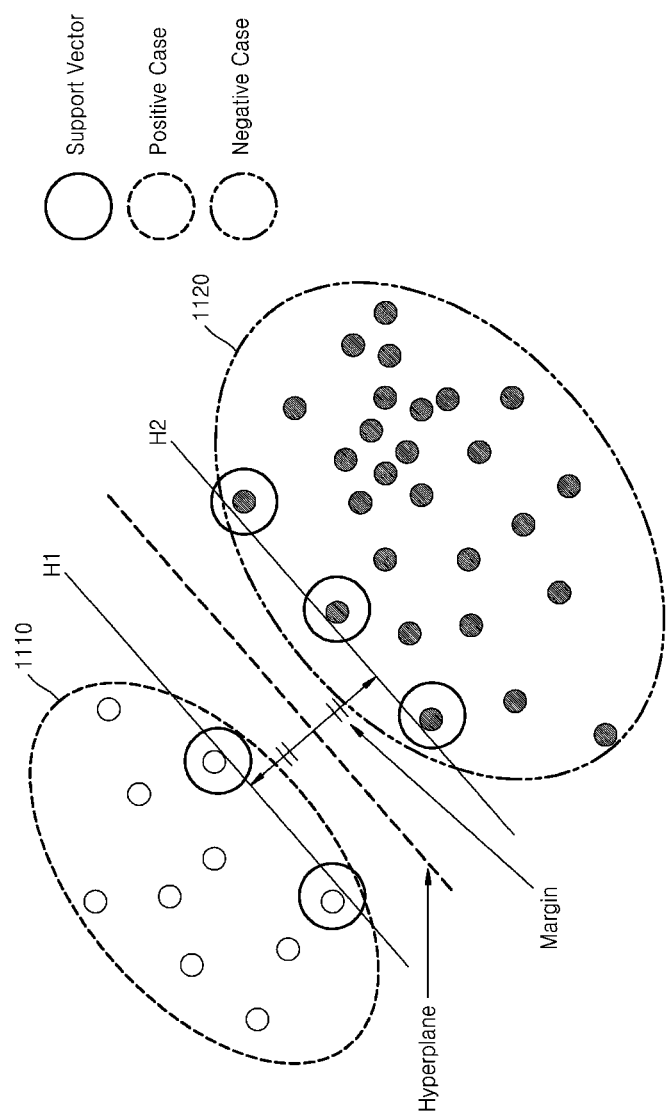
FIG. 11 is a view schematically illustrating a Support Vector Machine (SVM) method according to an embodiment of the present disclosure.

FIG. 11 is a view schematically illustrating a Support Vector Machine (SVM) method according to an embodiment of the present disclosure.

Referring to FIG. 11, according to the SVM method, when data consisting of white circles and black circles are given for a learning use, the white and black circles are classified into a white circle group and a black circle group mainly based on data located at a boundary between the two groups. The SVM method may perform classification and regression of the white and black circle groups by calculating a hyperplane to divide data into two groups. For example, in the SVM method, a support vector of FIG. 11 is obtained by using data for learning and a hyperplane having the maximum margin is obtained by using the support vector. The support vector may signify data used to divide the two groups.

When the first device 100 obtains a new feature vector $\overline{m}$ through a magnetic sensor, a gyroscope sensor, and an acceleration sensor, the first device 100 may check (e.g., determine) whether a magnetic substance exists therearound by applying the new feature vector $\overline{m}$ to an SVM algorithm. For example, when the new feature vector $\overline{m}$ belongs to a first group 1110, the first device 100 may determine that a magnetic substance exists within a predetermined range. When the new feature vector $\overline{m}$ belongs to a second group 1120, the first device 100 may determine that a magnetic substance does not exist within the predetermined range. The above algorithm will be described below in detail with reference to FIG. 12.

Figure 12:
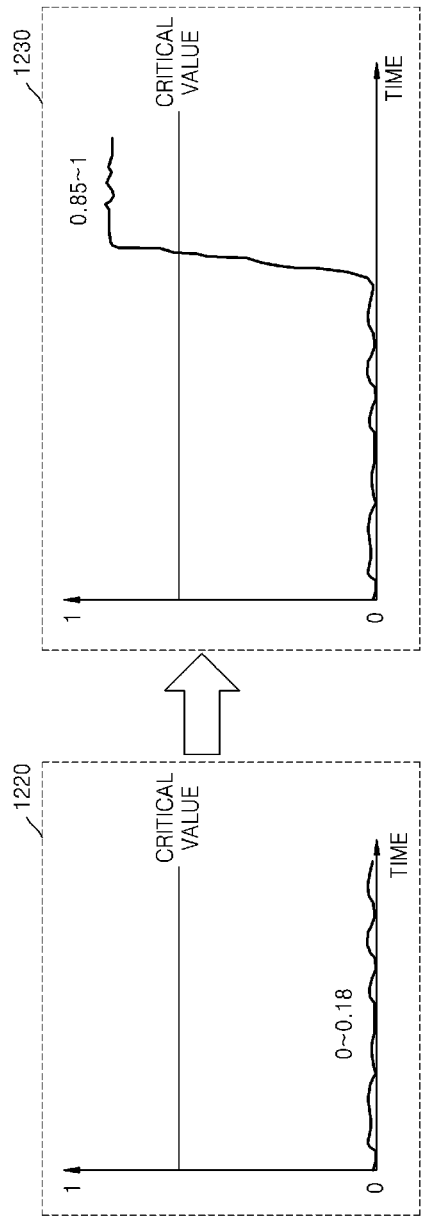
FIG. 12 is a view schematically illustrating a function to obtain magnetic field information according to an embodiment of the present disclosure.

FIG. 12 is a view schematically illustrating a function to obtain magnetic field information according to an embodiment of the present disclosure.

Referring to FIG. 12, as illustrated in a description 1210, when an input value is $X=[x_1, x_2, x_3, x_4, x_5, x_6, x_7, x_8, x_9]^T$ and N support vectors exist, the first device 100 may obtain the following Equation 3 by using the SVM algorithm.

$$f(x)=\Sigma_{i=1}^{N}\alpha_i y_i \overline{x}_i x+b \quad \text{Equation 3}$$

In Equation 3, "$\alpha$" represents a weighted value, y represents a target value of a support vector (+1 or −1), "$\overline{x}$" represents a support vector, and "b" represents a biased value.

The first device 100 may predict a magnetic magnitude or a magnetic force by using the above function. The first device 100 may calculate a function value by inputting the feature vector $\overline{m}$ to the function and normalize the calculated function value to be converted to a value between 0-1.

As illustrated by a first graph 1220, when the converted value is less than a preset critical value, for example, 0.8, the first device 100 may determine that a magnetic substance does not exist within a predetermined range. In contrast, as illustrated in a second graph 1230, when the converted value is greater than or equal to the preset critical value, for example, 0.8, the first device 100 may determine that a magnetic substance exists within the predetermined range.

Figure 13A:
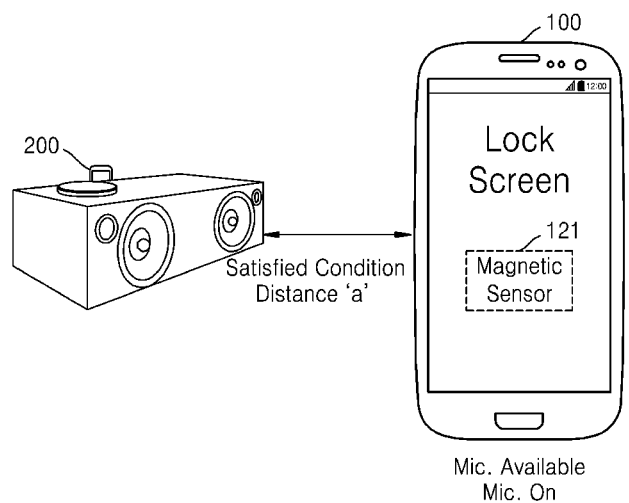
FIGS. 13A and 13B are views schematically illustrating an example in which a microphone is switched to an active state according to an embodiment of the present disclosure.
Figure 13B:
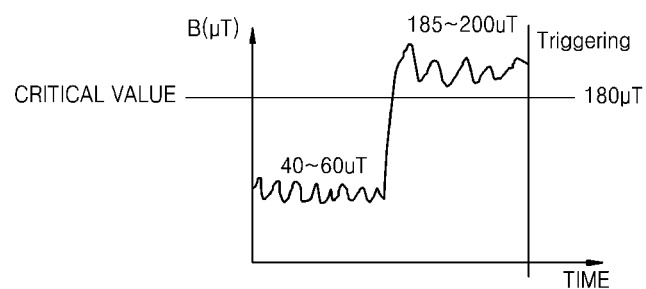

FIGS. 13A and 13B are views schematically illustrating an example in which a microphone is switched to an active state according to an embodiment of the present disclosure.

Referring to FIGS. 13A and 13B, the first device 100 is assumed to be a mobile terminal and the second device 200 is assumed to be a wireless speaker.

As illustrated in FIG. 13A, when the first device 100 approaches a wireless speaker, the magnetic sensor of the first device 100 may recognize a magnetic substance included in the wireless speaker. In other words, when the first device 100 exists within a distance "a" (e.g., 2 m), from the wireless speaker that is the second device 200, the magnetic sensor of the first device 100 recognizes the magnetic substance so that magnetic field information changes.

As illustrated in FIG. 13B, a magnetic magnitude that is maintained between 40-60 µT may be increased to 185-200 µT. In this case, the magnetic field information obtained through the magnetic sensor (e.g., 185-200 µT), exceeds the reference magnetic field information (e.g., 180 µT). Accordingly, the microphone in an inactive state may be switched to an active state.

According to various embodiments of the present disclosure, the first device 100 may receive a sound signal transmitted by the wireless speaker that is the second device 200 through the microphone that is switched to an active state. The first device 100 may analyze the sound signal received through the microphone. The sound signal may include at least one of identifier information of the wireless speaker, information about a state of the wireless speaker, and information about a communication method (e.g., Bluetooth, Wi-Fi, BLE, NFC, and/or the like), supported by the wireless speaker.

Thus, according to various embodiment of the present disclosure, the power consumed when the microphone is in a standby state may be reduced. In addition, when a sound signal is to be received through the microphone, the microphone may be automatically activated without a separate operation performed by a user on the first device 100.

Figure 14A:
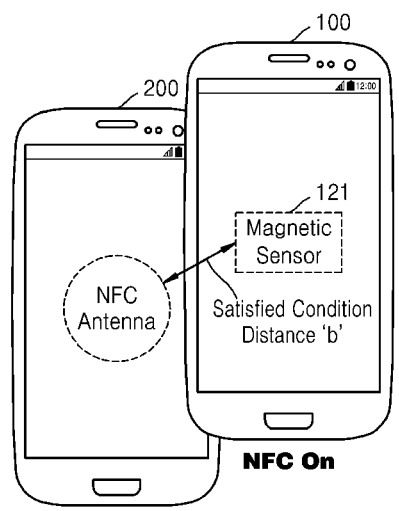
FIGS. 14A and 14B are views schematically illustrating an example in which an NFC unit is switched to an active state according to an embodiment of the present disclosure.
Figure 14B:
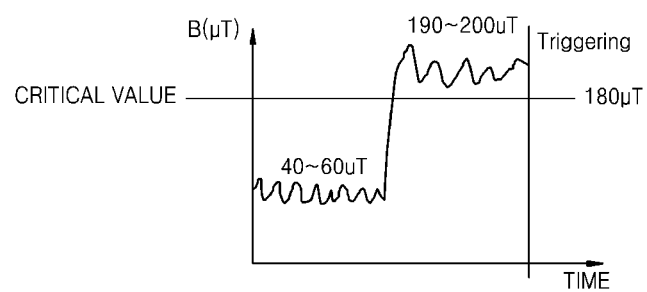

FIGS. 14A and 14B are views schematically illustrating an example in which an NFC unit is switched to an active state according to an embodiment of the present disclosure.

Referring to FIGS. 14A and 14B, both of the first device 100 and the second device 200 are assumed to be mobile terminals. The mobile terminal that is the second device 200 may include a speaker including a magnetic substance.

As illustrated in FIG. 14A, when the first device 100 approaches the second device 200, the magnetic sensor of the first device 100 may recognize the magnetic substance included in the second device 200. In other words, when the first device 100 exists within a distance "b" (e.g., 1 m), from the mobile terminal that is the second device 200, the magnetic sensor of the first device 100 recognizes the magnetic substance of the second device 200 so that magnetic field information changes.

As illustrated in FIG. 14B, a magnetic magnitude that is maintained between 40-60 µT may be increased to 185-200 µT. In this case, the magnetic field information obtained through the magnetic sensor (e.g., 190-200 µT), exceeds the reference magnetic field information (e.g., 180 µT). Accordingly, the first device 100 may switch the NFC unit in an inactive state to an active state.

Accordingly, when a user makes the first device 100 touch the second device 200, the first device 100 may receive information transmitted by the second device 200 through the NFC unit. For example, the first device 100 may receive from the second device 200 at least one of identifier information of the mobile terminal (e.g., a device ID, a MAC address, a device name, a product serial number, and/or the like), information about a state of the mobile terminal, and information about a communication method (e.g., Bluetooth, Wi-Fi, BLE, NFC, and/or the like), supported by the mobile terminal.

Thus, according to various embodiments of the present disclosure, the power consumed when a short range communication unit is in a standby state may be reduced. In addition, when a signal is to be received through the short range communication unit, the short range communication unit may be automatically activated without a separate operation performed by a user on the first device 100.

A method of automatically activating a plurality of communication units by the first device 100 when a predetermined event occurs will be described below in detail with reference to FIGS. 15A and 15B.

Figure 15A:
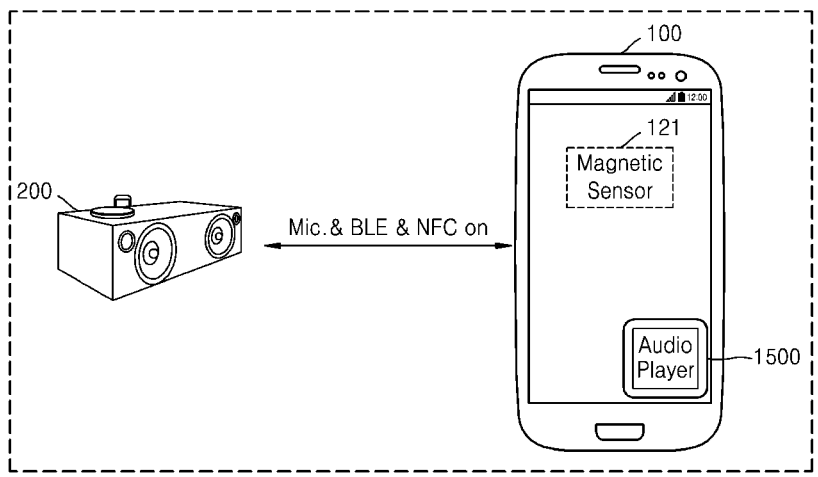
FIGS. 15A and 15B are views schematically illustrating an example in which a plurality of communication units are simultaneously or sequentially switched to an active state according to an embodiment of the present disclosure.
Figure 15B:
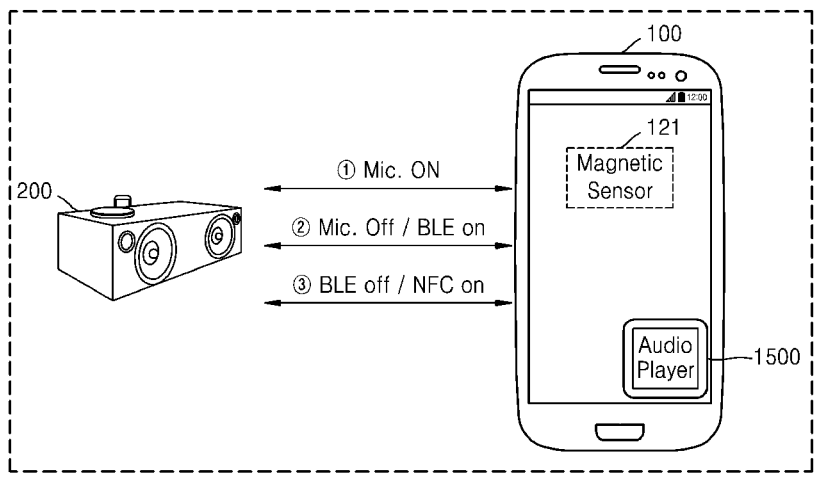

FIGS. 15A and 15B are views schematically illustrating an example in which a plurality of communication units are simultaneously or sequentially switched to an active state according to an embodiment of the present disclosure.

Referring to FIGS. 15A and 15B, the first device 100 is assumed to be a mobile terminal and the second device 200 is assumed to be an audio apparatus.

As illustrated in FIG. 15A, when a predetermined event related to a device scan occurs, the first device 100 may simultaneously activate a plurality of communication units. For example, when the value of the magnetic field information obtained through the magnetic sensor 121 is greater than or equal to the value of the reference magnetic information, the first device 100 may simultaneously activate the microphone, the BLE communication unit, and the NFC unit. The first device 100 may receive advertisement information broadcasted by the second device 200 through the microphone, the BLE communication unit, and the NFC unit.

As illustrated in FIG. 15B, when the value of the magnetic field information obtained through the magnetic sensor 121 is greater than or equal to the value of the reference magnetic information, the first device 100 may switch the communication units in an inactive state to an active state.

According to various embodiments of the present disclosure, the first device 100 may sequentially activate the communication units based on a predetermined order. The predetermined order may be set by a user or a system. In addition, the predetermined order may vary according to circumstances.

According to various embodiments of the present disclosure, the first device 100 may sequentially active the communication units based on the power consumption amount. For example, when the power consumption amount in an active state increases in an order of the BLE communication unit, the NFC unit, and the microphone, the first device 100 may sequentially activate the BLE communication unit, the NFC unit, and the microphone. According to various embodiments of the present disclosure, the first device 100 may randomly activate the communication units.

For example, when the first device 100 approaches the second device 200, the magnetic magnitude measured by the magnetic sensor 121 of the first device 100 may exceed the magnetic magnitude of the reference magnetic field. In this case, the first device 100 may first switch the microphone in an inactive state to an active state (e.g., operation 1). The first device 100 scans a sound signal transmitted by the second device 200 through the microphone.

If the second device 200 does not transmit a sound signal, the first device 100 does not scan a sound signal through the microphone. Thus, the first device 100 may switch the microphone in an active state to an inactive state after a predetermined time passes (e.g., operation 2). The first device 100 may receive advertisement information broadcasted by the second device 200 through the BLE communication unit.

If the second device 200 does not include a BLE chip, the first device 100 may not receive the advertisement information. Accordingly, the first device 100 may switch the BLE communication unit in an active state to an inactive state after a predetermined time and the NFC unit in an inactive state to an active state (e.g., operation 3). The first device 100 may receive information transmitted by the second device 200 through the NFC unit. For example, the first device 100 may receive identifier information of the second device 200, information about a state of the second device 200, and capability information about a communication method supported by the second device 200, which are transmitted by the second device 200, through the NFC unit.

According to various embodiments of the present disclosure, the first device 100 may request a communication connection from the second device 200 through the NFC unit. The first device 100 may provide an application 1500 related to the second device 200 on a screen based on the identified information of the second device 200. For example, the first device 100 may display on a screen the application 1500 (e.g., a remote control application), which may control the second device 200. When the application 1500 related to the second device 200 is not installed on the first device 100, the first device 100 may automatically search for the application 1500 related to the second device 200 and install the application 1500 on the first device 100.

When the second device 200 is not scanned for a predetermined time through the NFC unit, the first device 100 according to various embodiments of the present disclosure may display on a screen a message indicating that connection to the second device 200 (or scanning of the second device 200) failed.

Although in FIGS. 15A and 15B the detection of an occurrence of a predetermined event related to a device scan based on the magnetic field information obtained through the magnetic sensor 121 is described, various embodiments of the present disclosure are not limited thereto. In other words, the first device 100 may simultaneously or sequentially activate a plurality of communication units even when an event of unlocking a lock screen, an event of executing a preset application, or an event of selecting a preset button occurs.

According to various embodiments of the present disclosure, the first device 100 may simultaneously or sequentially activate at least one of communication units based on sound information received through the microphone that is always active or color information measured by an RGB sensor. In the following description, an example of detecting occurrence of a predetermined event related to a device scan by using an RGB sensor by the first device 100 will be described in detail with reference to FIGS. 16 to 18.

Figure 16:
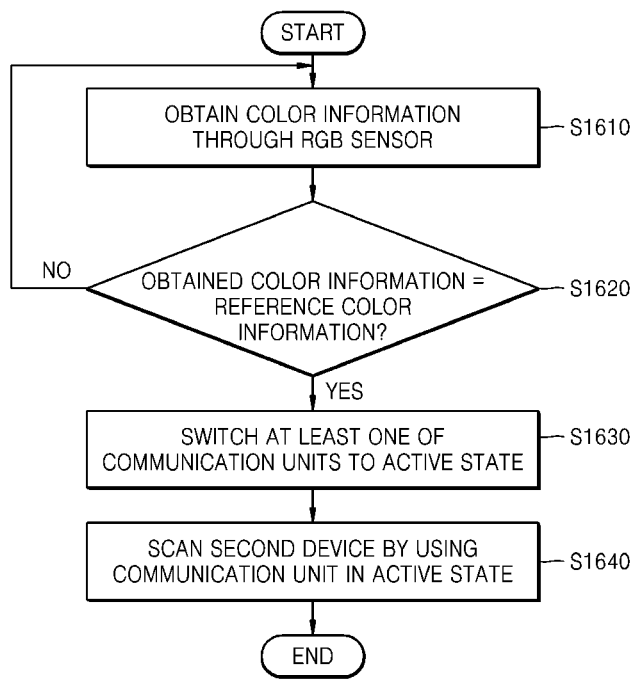
FIG. 16 is a flowchart for explaining a method of scanning a second device by using an a Red, Green, Blue (RGB) sensor according to an embodiment of the present disclosure.

FIG. 16 is a flowchart for explaining a method of scanning a second device by using an RGB sensor according to an embodiment of the present disclosure.

Referring to FIG. 16, in operation S1610, the first device 100 may obtain color information through the RGB sensor. The RGB sensor may signify a sensor for detecting a color emitted from a light source. When a light sensor is to analyze the three primary colors of light, the RGB sensor may be presented as a light sensor.

The color information according to various embodiments of the present disclosure may include a color (e.g., red, green, blue, white, and/or the like), a color intensity value (e.g., 0-255, color pattern information, and/or the like). However, various embodiments of the present disclosure are not limited thereto.

According to various embodiments of the present disclosure, the first device 100 may directly measure color information, may receive color information measured by an external device (e.g., an accessory, and/or the like), and/or may receive color information from a server. In the following description, for convenience of explanation, a case in which the first device 100 directly measures color information will be described.

In operation S1620, the first device 100 may compare color information obtained through the RGB sensor with preset reference color information. For example, the first device 100 may determine a similarity between the color information obtained through the RGB sensor and the preset reference color information.

The reference color information according to various embodiments of the present disclosure may signify the color (e.g., red, green, blue, white, and/or the like), the color intensity value, (e.g., 0-255), the color pattern information, and/or the like. For example, the reference color information may be a pattern in which a color change value is greater than or equal to a critical value in the order of red, green, and blue.

According to various embodiments of the present disclosure, the reference color information may be set by a user, the first device 100, or an external server. However, various embodiments of the present disclosure are not limited thereto.

The first device 100 according to various embodiments of the present disclosure may extract reference color information from the memory and compare the extracted reference color information with the color information obtained through the RGB sensor. According to various embodiments of the present disclosure, the sensor hub may compare the color information obtained through the RGB sensor with the reference color information. In this case, because the AP may be in a sleep mode, the power consumed by the first device 100 may be reduced.

According to various embodiments of the present disclosure, the AP may compare the color information obtained through the RGB sensor with the reference color information. In this case, the sensor hub may be in a sleep state.

According to various embodiments of the present disclosure, when a similarity between the color information obtained through the RGB sensor with the reference color information that may change in order of, for example, red→green→blue→green, is less than a predetermined value (e.g., 90%), the first device 100 maintaining the communication unit in an inactive state may continuously monitor color information therearound through the RGB sensor.

In operation S1630, when a similarity between the color information obtained through the RGB sensor and the reference color information is greater than or equal to a predetermined value of 90%, the first device 100 may switch at least one communication unit to an active state. In other words, if the similarity between the color information obtained through the RGB sensor and the reference color information is greater than or equal to the predetermined value of 90%, the first device 100 may determine that a predetermined event related to a device scan occurs.

For example, when the color information obtained through the RGB sensor that may change in order of, for example, red→green→blue→green, matches the reference color information that may change in order of, for example, red→green→blue→green, the first device 100 according to various embodiments of the present disclosure may switch the communication unit in an inactive state to an active state.

According to various embodiments of the present disclosure, while monitoring the color information detected by the RGB sensor, the sensor hub of the SSP may wake up the AP in a sleep mode when the similarity between the color information and the reference color information is greater than or equal to the predetermined value of, for example, 90%. The AP may receive from the sensor hub information about a current state of the first device 100 (e.g., color information, a job to be done, and/or the like). The AP may switch the communication unit in an inactive state to an active state based on the information received from the sensor hub.

Thus, the first device 100 according to various embodiments of the present disclosure may reduce standby power consumed by the communication unit by maintaining the communication unit in an inactive state in a general case. In addition, because the first device 100 according to various embodiments of the present disclosure switches the communication unit in an inactive state to an active state when a similarity between the color information and the reference color information is greater than or equal to the predetermined value of, for example, 90%, the communication unit may be automatically activated without a separate operation by the user when communication is needed.

In operation S1640, the first device 100 may scan the second device 200 by using the communication unit switched to an active state. Because operation S1640 corresponds to operation S740 of FIG. 7, a detailed description thereof is omitted herein. An example in which the first device 100 switches the communication unit to an active state based on the color information measured by the RGB sensor will be described below in detail with reference to FIGS. 17A and 17B and FIGS. 18A and 18B.

FIGS. 17A, 17B, 18A, and 18B are views schematically illustrating an example in which a communication unit is switched to an active state according to color information measured by an RGB sensor according to an embodiment of the present disclosure.

Referring to FIGS. 17A to 18B, both of the first device 100 and the second device 200 are mobile terminals. The mobile terminal that is the second device 200 may include a Light Emitting Diode (LED) or a display unit for displaying an image.

Figure 17A:
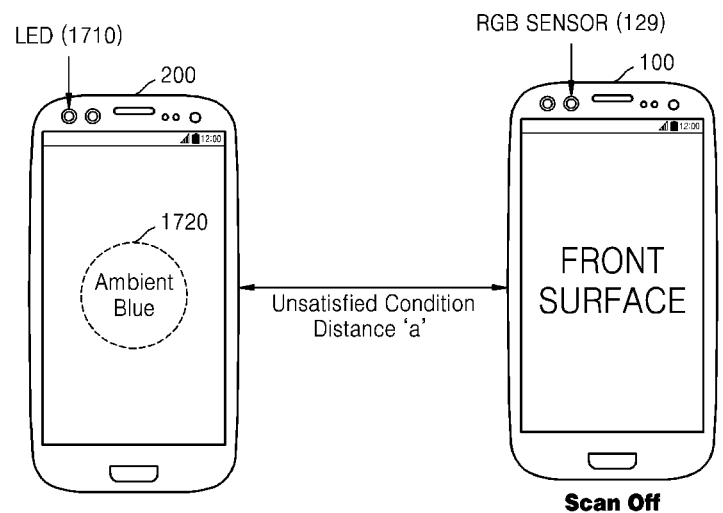
FIGS. 17A, 17B, 18A, and 18B are views schematically illustrating an example in which a communication unit is switched to an active state according to color information measured by an RGB sensor according to an embodiment of the present disclosure.

As illustrated in FIG. 17A, when the first device 100 is spaced apart from the mobile terminal that is the second device 200 by a distance "a" (e.g., 1 m), an RGB sensor 129 of the first device 100 may not recognize the color of light emitted from an LED 1710 of the second device 200 or the color of an image 1720 output from the display unit of the second device 200.

Figure 17B:
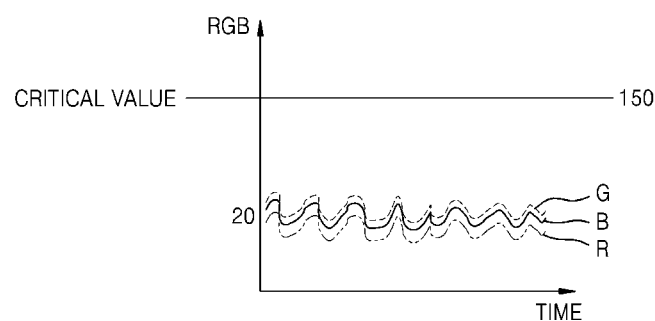

Accordingly, as illustrated in FIG. 17B, because color information obtained through the RGB sensor 129 (e.g., each of a red value, a green value, and a blue value is 15-25), does not match reference color information (e.g., a pattern of exceeding a critical value in order of a red value, a green value, and a blue value), the first device 100 may maintain the communication unit in an inactive state.

Figure 18A:
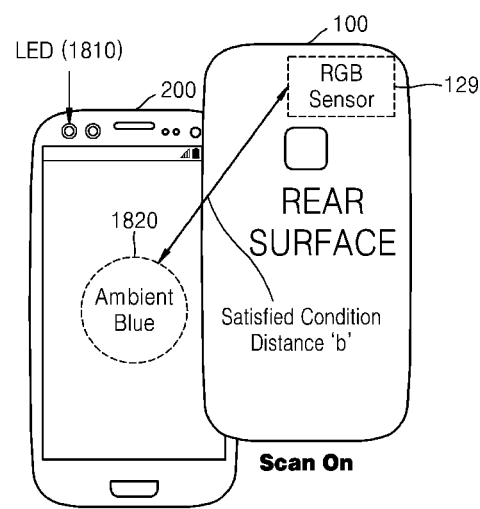

As illustrated in FIG. 18A, when a user makes the first device 100 approach the second device 200, the RGB sensor 129 of the first device 100 may recognize the color of light emitted from an LED 1810 of the second device 200 or the color of an image 1820 output from the display unit of the second device 200. For example, when the distance between the front surface of the first device 100 including the RGB sensor 129 and the front surface of the second device 200 is within a distance "d" (e.g., 5 cm), the RGB sensor 129 of the first device 100 may recognize the light emitted from the LED 1810 or the display unit of the second device 200 and thus an RGB sensor value (e.g., a red value, a green value, a blue value, a color change pattern, and/or the like), may vary.

Figure 18B:
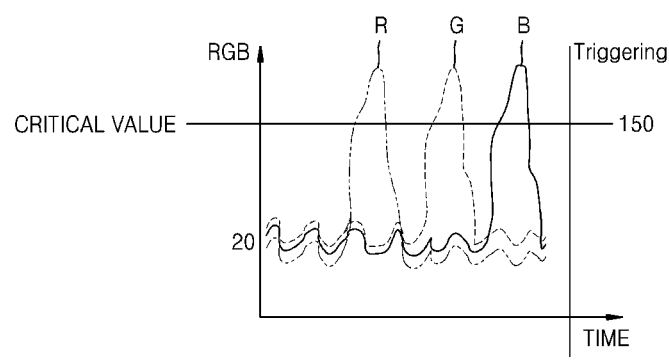

As illustrated in FIG. 18B, when the LED 1810 of the second device 200 emits light in the order of red, green, and blue or the display unit of the second device 200 displays on the screen in order of a red image, a green image, and a blue image, a value measured by the RGB sensor 129 of the first device 100 may exceed a critical value 150 in order of a red value, a green value, and a blue value. In this case, because the color information obtained through the RGB sensor 129 (e.g., the pattern of exceeding a critical value in order of a red value, a green value, and a blue value), matches the reference color information (e.g., the pattern of exceeding a critical value in order of a red value, a green value, and a blue value), the first device 100 may switch the communication unit in an inactive state to an active state.

In the following description, a method of detecting occurrence of a predetermined event related to a device scan by using sound information obtained through the microphone by the first device 100 will be described below in detail with reference to FIGS. 19, 20A, and 20B.

Figure 19:
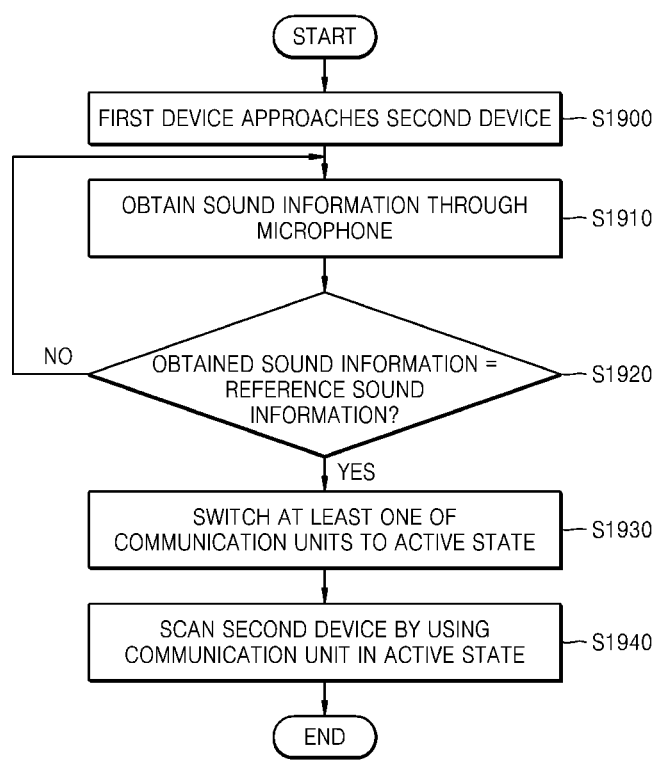
FIG. 19 is a flowchart for explaining a method of scanning a second device by using a microphone that is always activated according to an embodiment of the present disclosure.

FIG. 19 is a flowchart for explaining a method of scanning a second device by using a microphone that is always activated according to an embodiment of the present disclosure.

Referring to FIG. 19, in operation 1900, the first device 100 approaches the second device 200.

In operation S1910, the first device 100 may obtain sound information through the microphone. The microphone of the first device 100 may be connected to the sensor hub to be always in an active state. The sound information according to various embodiments of the present disclosure may be information about a sound signal pattern, a cycle of receiving a sound signal, and/or the like.

In operation S1920, the first device 100 may compare the sound information obtained through the microphone with the preset reference sound information. For example, the first device 100 may determine a similarity between the sound signal pattern received through the microphone and the preset reference sound signal pattern.

The reference sound information according to various embodiments of the present disclosure may signify information about a sound signal pattern (e.g., a predetermined voice, a sound signal receiving cycle which is a standard for switching the communication unit in an inactive state to an active state, and/or the like). According to various embodiments of the present disclosure, the reference sound information may be set by a user, the first device 100, or an external device. However, various embodiments of the present disclosure are not limited thereto.

The first device 100 according to various embodiments of the present disclosure may extract reference sound information from the memory and compare the extracted reference sound information with the sound information obtained through the microphone. According to various embodiments of the present disclosure, because the microphone is connected to the sensor hub, the sensor hub may compare the sound information obtained through the microphone with the reference sound information. In this case, because the AP may be in a sleep mode, the power consumed by the first device 100 may be reduced.

According to various embodiments of the present disclosure, the AP may compare the sound information obtained through the microphone with the reference sound information. In this case, the sensor hub may be in a sleep state.

According to various embodiments of the present disclosure, when a similarity between the sound information obtained through the microphone with the reference sound information is less than a predetermined value (e.g., 90%), the first device 100 maintaining the communication unit in an inactive state may continuously monitor ambient sound information through the microphone.

In operation S1930, when a similarity between the sound information obtained through the microphone and the reference sound information is greater than or equal to a predetermined value of, for example, 90%, the first device 100 may switch at least one communication unit to an active state. In other words, if the similarity between the sound information obtained through the microphone and the reference sound information is greater than or equal to the predetermined value of 90%, the first device 100 may determine that a predetermined event related to a device scan occurs.

For example, when the sound information obtained through the microphone matches the reference sound information, the first device 100 according to various embodiments of the present disclosure may switch the communication unit in an inactive state to an active state.

According to various embodiments of the present disclosure, while monitoring the sound information detected by the microphone, the sensor hub may wake up the AP in a sleep mode when the similarity between the sound information and the reference sound information is greater than or equal to the predetermined value of, for example, 90%. The AP may receive from the sensor hub information about a current state of the first device 100 (e.g., sound information, a job to be done, and/or the like). The AP may switch the communication unit in an inactive state to an active state based on the information received from the sensor hub.

Thus, the first device 100 according to various embodiments of the present disclosure may reduce standby power consumed by the communication unit by maintaining the communication unit in an inactive state in a general case. In addition, because the first device 100 according to various embodiments of the present disclosure switches the communication unit in an inactive state to an active state when a similarity between the sound information and the reference sound information is greater than or equal to the predetermined value of, for example, 90%, the communication unit may be automatically activated without a separate operation by the user when communication is needed.

In operation S1940, the first device 100 may scan the second device 200 by using the communication unit switched to an active state. Because operation S1940 corresponds to operation S740 of FIG. 7, a detailed description thereof is omitted herein. An example in which the first device 100 switches the communication unit to an active state based on the sound information will be described below in detail with reference to FIGS. 20A and 20B.

Figure 20A:
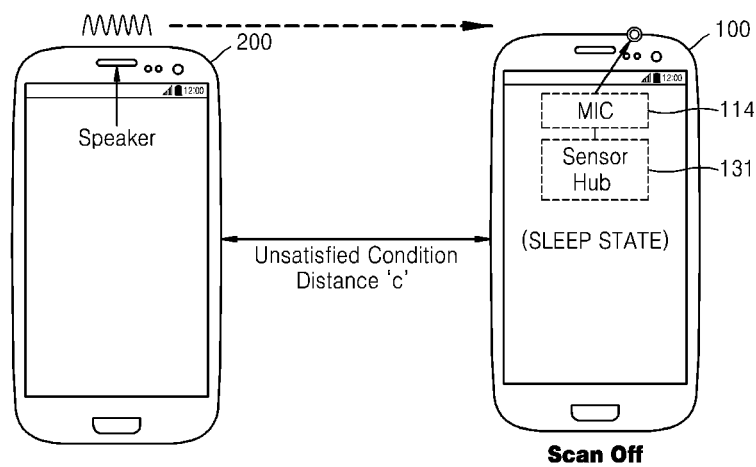
FIGS. 20A and 20B are views schematically illustrating an example in which a communication unit is switched to an active state according to sound information obtained through the microphone according to an embodiment of the present disclosure.
Figure 20B:
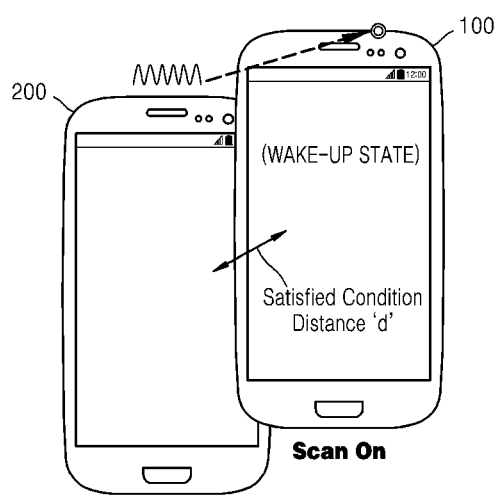

FIGS. 20A and 20B are views schematically illustrating an example in which a communication unit is switched to an active state according to sound information measured by the microphone according to an embodiment of the present disclosure.

Referring to FIGS. 20A and 20B, both of the first device 100 and the second device 200 are assumed to be mobile terminals.

As illustrated in FIG. 20A, the second device 200 may output a sound signal of a predetermined pattern through the speaker to switch the communication unit of the first device 100 to an active state. The second device 200 may output a sound signal of a predetermined pattern to switch the communication unit of the first device 100 to an active state and then output through the speaker a sound signal in which advertisement information is embedded. The second device 200 according to various embodiments of the present disclosure may output a sound signal of a predetermined pattern or a sound signal including advertisement information by using an inaudible frequency range, for example, 18 kHz-21 kHz.

However, when the first device 100 is spaced apart from the mobile terminal that is the second device 200 by a distance "c" (e.g., 2 m), the microphone 114 of the first device 100 may not recognize a sound signal of a predetermined pattern output from the second device 200. Accordingly, because sound information obtained through the microphone 114 does not match the reference sound information, the first device 100 may maintain the communication unit in an inactive state.

As illustrated in FIG. 20B, when a user makes the first device 100 approach the second device 200, the first device 100 may recognize the sound signal of a predetermined pattern output from the second device 200, through the microphone 114. If the sound signal of a predetermined pattern output from the second device 200 is to switch the communication unit of the first device 100 to an active state, the first device 100 may switch the communication unit in an inactive state to an active state.

Although in the above descriptions the example of triggering the device scanning of the first device 100 by using the magnetic field information obtained through the magnetic sensor, the color information obtained through the RGB sensor, or the sound information obtained through the microphone, the broadcasting of the second device 200 may be triggered by using the magnetic field information, the color information, or the sound information.

For example, when recognizing light of a predetermined pattern or a sound signal of a predetermined pattern output from the first device 100, the second device 200 may switch the communication unit to an active state and broadcast advertisement information (e.g., to the outside environment) through the communication unit that is switched to the active state.

In addition, the magnetic sensor of the second device 200 may recognize a magnetic substance included in the first device 100. When the magnetic field information obtained through the magnetic sensor is greater than or equal to the reference magnetic field information, the second device 200 may switch the communication unit to an active state and broadcast advertisement information (e.g., to the outside environment) through the communication unit that is switched to the active state.

Accordingly, because the second device 200 according to various embodiments of the present disclosure may switch the communication unit to an active state and broadcast advertisement information through the communication unit that is switched to the active state only when other device exits within a predetermined range from the second device 200, the power consumed by the communication unit may be reduced.

The establishment of a first communication link and a second communication link with the second device 200 by the first device 100 will be described below in detail with reference to FIGS. 21 to 23.

FIG. 21 is a flowchart for explaining a method of determining a second communication method through a BLE communication according to an embodiment of the present disclosure.

Referring to FIG. 21, in operation S2105, the second device 200 may broadcast advertisement information including identifier information and capability information about a supported communication method by using a plurality of communication methods. The second device 200 broadcasts advertisement information in a plurality of communication methods because the second device 200 does not know which communication method is supported by the first device 100. The communication methods may include the BLE communication method, the ANT+ communication method, the NFC method, the sound communication method, the ZigBee communication method, the two-dimensional barcode method (e.g., a QR code), the touch code method, and/or the like. However, various embodiments of the present disclosure are not limited thereto.

In operation S2110, the first device 100 may monitor events occurring in the first device 100. For example, the first device 100 may monitor an application execution event, a user input event, an event of changing a sensing value (e.g., magnetic field information or position information), measured by a sensor, and/or the like.

In operation S2115, the first device 100 may detect occurrence of a predetermined event related to a device scan. The predetermined event in the present embodiment may be an event of triggering scanning of an external device. For example, the first device 100 may detect an event of unlocking a lock screen, an event of executing a preset application, an event of selecting a preset button, and/or the like. Because this operation is already describe in the above with reference to FIGS. 5 to 7, detailed descriptions thereof are omitted herein.

In operation S2120, when occurrence of a predetermined event related to a device scan is detected, the first device 100 may switch the BLE communication unit having a small power consumption amount to an active state.

In operation S2125, the first device 100 may try to scan the second device 200 through the BLE communication unit. For example, the first device 100 may receive advertisement information including the identifier information and the capability information about a supported communication method which are broadcasted by the second device 200, and may analyze the received advertisement information.

In operation S2130, when the first device 100 succeeds scanning of the second device 200 through the BLE communication unit (e.g., the first device 100 receives advertisement information broadcasted by the second device 200 through the BLE communication unit), the second device 200 may transmit a response message with respect to the advertisement information of the second device 200 to the second device 200 through the BLE communication unit. For example, the first device 100 may embed identifier information of the first device 100, capability information about a communication method supported by the first device 100, and information about a communication method preferred by the first device 100 in the advertisement information, or may broadcast or transmit the advertisement information to the second device 200 in the BLE communication method.

In operation S2135, the first device 100 and the second device 200 may establish a BLE communication link (first communication link). The BLE communication link (first communication link) according to various embodiments of the present disclosure may be a virtual communication link of a non-connection type that communicates the advertisement information by mutual scan, or a communication link of a connection type in which a session is formed by a BLE connection request of the first device 100.

In operation S2140, the first device 100 may determine a second communication method via the BLE communication link (first communication link). For example, the first device 100 may select Bluetooth as a communication method for communicating data and transmit a Bluetooth connection request (negotiation request) to the second device 200 via the BLE communication link (first communication link). The second device 200 may transmit a response message with respect to the Bluetooth connection request (negotiation request) to the first device 100 via the BLE communication link (first communication link). If the second device 200 transmits a message to accept the Bluetooth connection to the first device 100, the first device 100 and the second device 200 may establish a Bluetooth connection therebetween.

In contrast, the second device 200 may not accept the Bluetooth connection request (negotiation request) of the first device 100 and may transmit a Wi-Fi connection request (negotiation request) to the first device 100 via the BLE communication link (first communication link). In this case, if the first device 100 accepts the Wi-Fi connection request, the first device 100 and the second device 200 may establish a Wi-Fi connection therebetween.

In operation S2145, the first device 100 and the second device 200 may establish the second communication link therebetween. For example, the first device 100 and the second device 200 may exchange connection information needed for establishing the second communication link (e.g., an SSID, an IP address, a MAC address, a channel number, a security key, a BlueTooth (BT) address, a product name, profile information, and/or the like), and thus, establish a Bluetooth communication link or a Wi-Fi communication link. The establishment of the second communication link will be described below in detail with reference to FIGS. 24A and 24B.

In operation S2150, the first device 100 may transmit data to the second device 200 via the second communication link (e.g., a Bluetooth communication link, a Wi-Fi communication link, and/or the like). For example, the first device 100 may transmit texts, music, moving pictures, photos, applications, and/or the like, to the second device 200 via the second communication link (e.g., a Bluetooth communication link, a Wi-Fi communication link, and/or the like).

In operation S2155, the first device 100 according to various embodiments of the present disclosure may determine whether data transmission is completed.

In operation S2160, when the data transmission is completed, the first device 100 may terminate the second communication link (e.g., a Bluetooth communication link, a Wi-Fi communication link, and/or the like). The first device 100 according to various embodiments of the present disclosure may maintain the BLE communication link (first communication link) having a small power consumption amount as a control channel.

Thus, when the second communication link (e.g., a Bluetooth communication link, a Wi-Fi communication link, and/or the like), is needed again, for example, when data to be transmitted to the second device 200 exists, the first device 100 may quickly reestablish the second communication link (e.g., a Bluetooth communication link, a Wi-Fi communication link, and/or the like), by using the BLE communication link (first communication link).

In operation S2165, when the first device 100 fails the scanning of the second device 200 via the BLE communication unit, the first device 100 may switch another communication unit to an active state. For example, when the first device 100 or the second device 200 does not include the BLE communication unit, the first device 100 is not able to scan the second device 200 via the BLE communication unit. Accordingly, the first device 100 switches the BLE communication unit to an inactive state and activates another communication unit, for example, the microphone. In the following description, an example in which the first device 100 activates the microphone to scan the second device 200 will be described in detail with reference to FIG. 22.

Figure 22:
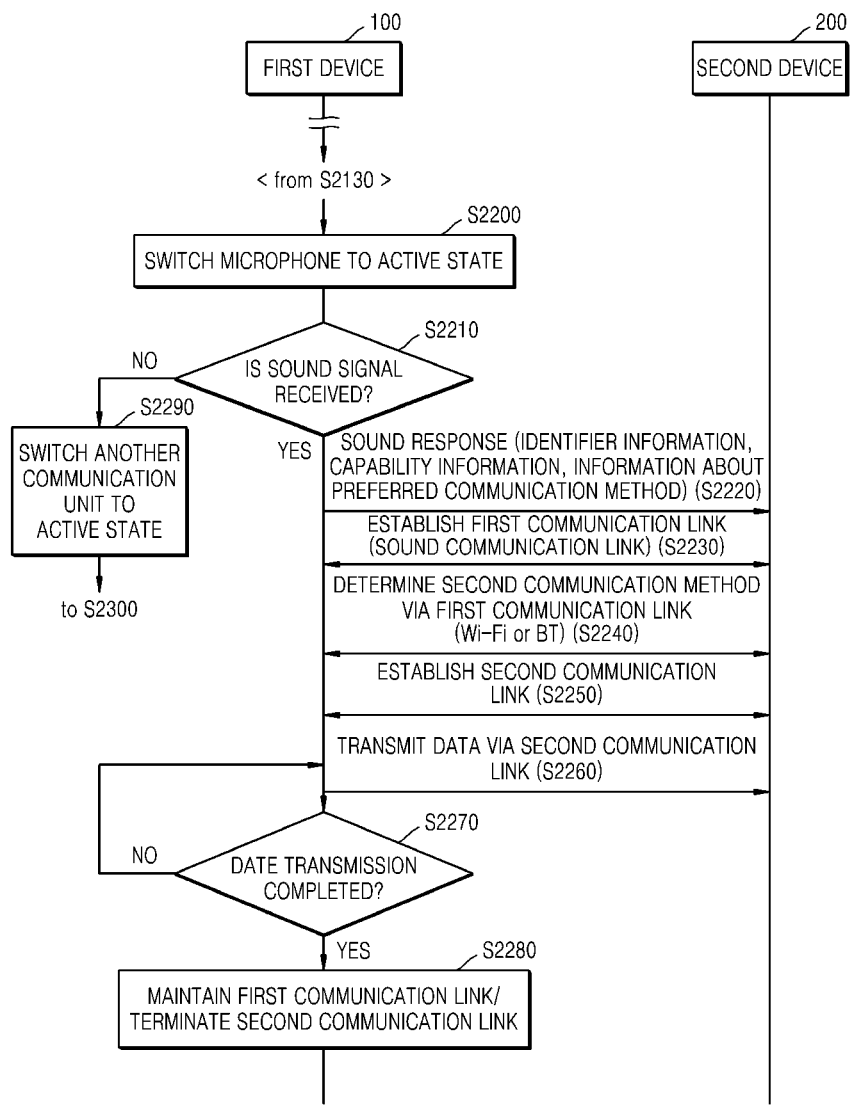
FIG. 22 is a flowchart for explaining a method of determining a second communication method through a sound communication according to an embodiment of the present disclosure.

FIG. 22 is a flowchart for explaining a method of determining a second communication method through a sound communication according to an embodiment of the present disclosure.

Referring to FIG. 22, in operation S2200, the first device 100 may switch the BLE communication unit to an inactive state and switch the microphone to an active state.

In operation S2210, the first device 100 may try to scan the second device 200 through the microphone. For example, the first device 100 may receive a sound signal broadcasted by the second device 200. The sound signal may include identifier information of the second device 200, capability information of the second device 200, and information about a preferred communication method of the second device 200.

According to various embodiments of the present disclosure the first device 100 may analyze the received sound signal. In this case, the second device 200 may check (e.g., determine) information about an address for accessing the second device 200 (identifier information), a communication method supported by the second device 200, and a service provided by the second device 200.

In operation S2220, when the first device 100 receives a sound signal transmitted by the second device 200 through the microphone, the first device 100 may generate a sound signal including a response message with respect to the advertisement information of the second device 200 and may transmit a generated sound signal to the second device 200 through the speaker.

For example, the first device 100 may embed in an inaudible range of the sound signal the identifier information of the first device 100, the capability information about a communication method supported by the first device 100, and information about a communication method preferred by the first device 100, and may transmit the sound signal to the second device 200 through the speaker. According to various embodiments of the present disclosure, the identifier information, the capability information, and the preferred communication method information of the first device 100 may be embedded in an audible range of the sound signal and transmitted.

In operation S2230, the first device 100 and the second device 200 may establish a sound communication link (first communication link). The sound communication link (first communication link) according to various embodiments of the present disclosure may be a communication link in which the first device 100 and the second device 200 embed data in a sound signal and output the sound signal through the speaker and receive the sound signal through the microphone.

In operation S2240, the first device 100 may determine a second communication method via the sound communication link (first communication link). For example, the first device 100 may select Bluetooth as a communication method for communicate data and transmit a Bluetooth connection request (negotiation request) to the second device 200 via the sound communication link (first communication link). The second device 200 may transmit a response message with respect to the Bluetooth connection request (negotiation request) to the first device 100 via the sound communication link (first communication link). If the second device 200 transmits a message to accept the Bluetooth connection to the first device 100, the first device 100 and the second device 200 may establish a Bluetooth connection therebetween.

In contrast, the second device 200 may not accept the Bluetooth connection request (negotiation request) of the first device 100 and transmit a Wi-Fi connection request (negotiation request) to the first device 100 via the sound communication link (first communication link). In this case, if the first device 100 accepts the Wi-Fi connection request, the first device 100 and the second device 200 may establish a Wi-Fi connection therebetween.

In operation S2250, the first device 100 and the second device 200 may establish the second communication link therebetween. For example, the first device 100 and the second device 200 may exchange connection information needed for establishing the second communication link (e.g., an SSID, an IP address, a MAC address, a channel number, a security key, a BT address, a product name, profile information, and/or the like), and thus establish a Bluetooth communication link or a Wi-Fi communication link. The establishment of the second communication link will be described below in detail with reference to FIGS. 24A and 24B.

In operation S2260, the first device 100 may transmit data to the second device 200 via the second communication link (e.g., a Bluetooth communication link, a Wi-Fi communication link, and/or the like).

In operation S2270, the first device 100 according to various embodiments of the present disclosure may determine whether data transmission is completed.

In operation S2280, when the data transmission is completed, the first device 100 may terminate the second communication link (e.g., a Bluetooth communication link, a Wi-Fi communication link, and/or the like). The first device 100 according to various embodiments of the present disclosure may maintain the sound communication link (first communication link) having a small power consumption amount as a control channel. Because operations S2260 to S2280 correspond to operation S2150 to S2160 of FIG. 21, detailed descriptions thereof are omitted herein.

In operation S2290, when the first device 100 fails to receive the sound signal transmitted by the second device 200 through the microphone, the first device 100 may switch another communication unit to an active state. For example, the first device 100 may switch the microphone to an inactive state and activate a camera to recognize a two-dimensional barcode (e.g., a QR code). In the following description, an example in which the first device 100 activates the camera to scan the two-dimensional barcode (e.g., a QR code), displayed on the second device 200 will be described in detail with reference to FIG. 23.

Figure 23:
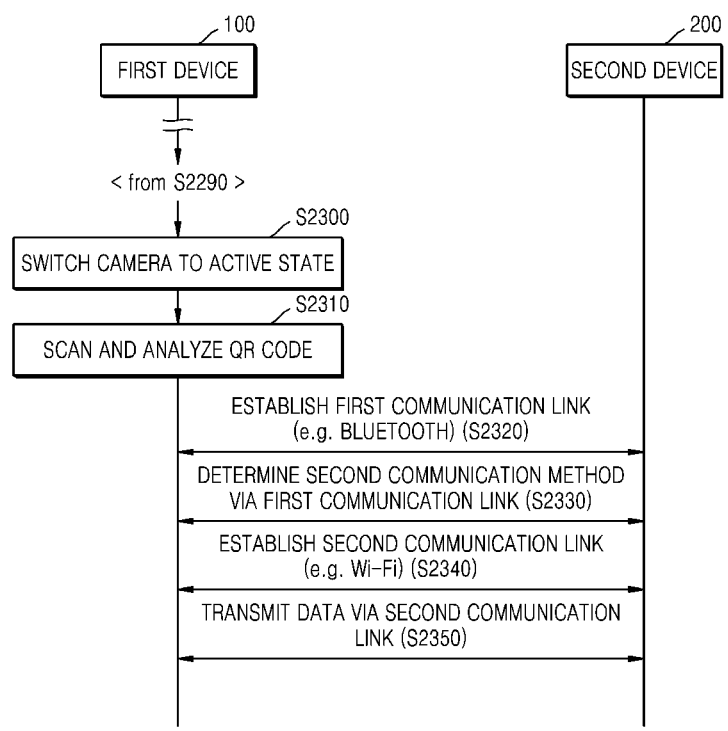
FIG. 23 is a flowchart for explaining a method of determining first and second communication methods through a two-dimensional barcode such as, for example, a QR code according to an embodiment of the present disclosure.

FIG. 23 is a flowchart for explaining a method of determining first and second communication methods through a two-dimensional barcode such as, for example, a QR code according to an embodiment of the present disclosure.

Referring to FIG. 23, in operation S2300, the first device 100 may switch the camera to an active state.

In operation S2310, the first device 100 may scan and analyze a QR code displayed on the screen of the second device 200 through the camera. The QR code may include the identifier information of the second device 200, the capability information about a communication method supported by the second device 200, and information about a communication method preferred by the second device 200.

Accordingly, by analyzing the QR code, the first device 100 may check (e.g., determine) information about an address for accessing the second device 200 (identifier information), a communication method supported by the second device 200, and a communication method preferred by the second device 200.

In operation S2320, the first device 100 may establish a first communication link with the second device 200. For example, the second device 200 may prefer a Bluetooth communication. In this case, when the first device 100 makes a Bluetooth connection request to the second device 200 and the second device 200 accepts the request, the first device 100 and the second device 200 may establish a Bluetooth communication link as the first communication link through a paring process.

In operation S2330, the first device 100 may determine a second communication method to substantially communicate data with the second device 200 via the Bluetooth communication link (first communication link). For example, the first device 100 may determine a Wi-Fi communication method as the second communication method through the negotiation with the second device 200.

In operation S2340, the first device 100 may establish a Wi-Fi communication link (second communication link) with the second device 200.

In operation S2350, the first device 100 may transmit data to the second device 200 via the Wi-Fi communication link (second communication link). In other words, according to various embodiments of the present disclosure, when the second device 200 does not support the BLE communication or sound communication, the first device 100 and the second device 200 may determine the Bluetooth (Wi-Fi) communication method as the first communication method or the Wi-Fi (Bluetooth) communication method as the second communication method. An example of the first and second communication links will be described below in detail with reference to FIGS. 24A and 24B.

Figure 24A:
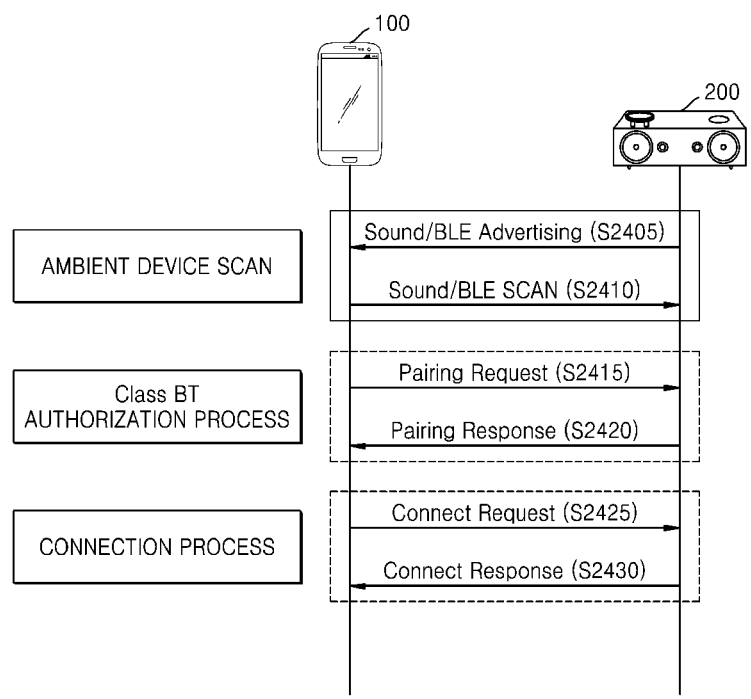
FIGS. 24A and 24B are flowcharts for explaining an example of establishing a first communication link and a second communication link according to an embodiment of the present disclosure.
Figure 24B:
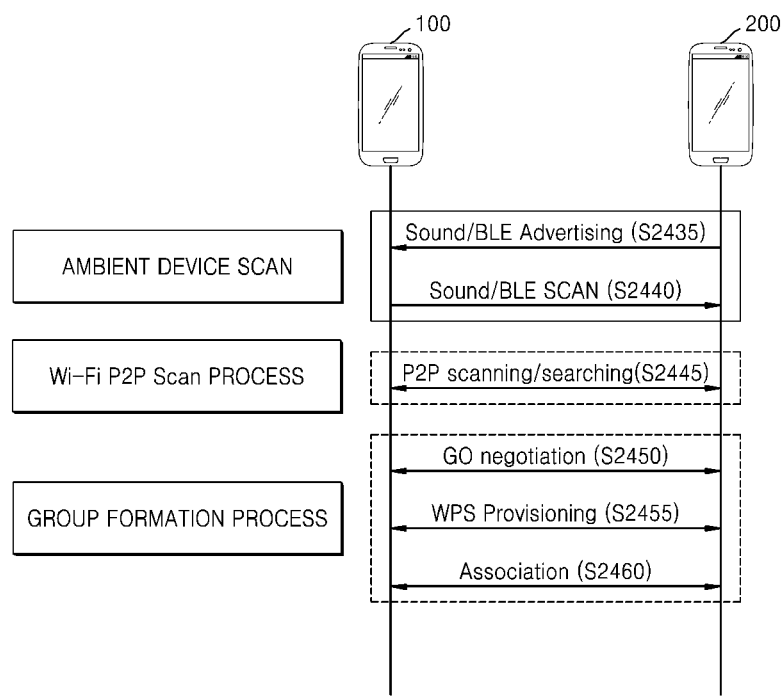

FIGS. 24A and 24B are flowcharts for explaining an example of establishing a first communication link and a second communication link according to an embodiment of the present disclosure.

Referring to FIG. 24A, the first device 100 is assumed to be a mobile terminal and the second device 200 is assumed to be a wireless speaker.

In operation S2405, the wireless speaker that is the second device 200 may broadcast a sound signal and/or an advertising packet, which includes advertisement information, by using the sound output unit and/or the BLE communication unit.

In operation S2410, when a predetermined event related to a device scan is detected, the first device 100 may scan the second device 200 by using the microphone or the BLE communication unit. The first device 100 and the second device 200 may establish a sound communication link or a BLE communication link as the first communication link. The first device 100 may determine a Bluetooth communication method as the second communication method to communicate data via the first communication link.

In operation S2415, the first device 100 may request pairing with the second device 200. Pairing is a process of checking (e.g., determining) a password, identifier information, security information, authorization information, and/or the like, which are set for mutual communication connection between the first device 100 and the second device 200 that support a Bluetooth function.

In operation S2420, the first device 100 may receive a pairing response. In other words, the second device 200 in response to the pairing request may transmit personal identification information to the first device 100. An example of the personal identification information may be a Personal Identification Number (PIN) code. The personal identification information may be created just for a single use or stored in the memory. When the personal identification information requested by the first device 100 matches the personal identification information received from the second device 200, the pairing between the first device 100 and the second device 200 may be completed.

In operation S2425, the first device 100 may make a Bluetooth connection request to the second device 200.

In operation S2430, the second device 200 may respond to the connection request by the first device 100. In this case, the second device 200 may establish a Bluetooth communication link with the second device 200. Because the process of establishing a Bluetooth communication link is a well-known technology, a detailed description thereof is omitted herein.

Referring to FIG. 24B, both of the first device 100 and the second device 200 are assumed to be mobile terminals. Operations S2435 and S2440 of FIG. 24A may correspond to Operations S2405 and S2410 of FIG. 24B, respectively. In other words, the first device 100 and the second device 200 may establish a sound communication link or a BLE communication link as the first communication link. The first device 100 may determine a WFD communication method as the second communication method for communicate data via the first communication link.

In operation S2445, the first device 100 may scan the second device 200 that includes a WFD function. When the second device 200 is scanned, the first device 100 may be connected to the second device 200 through forming of a group (one-to-one or one-to-many topology).

In operation S2450, the first device 100 may perform the forming of a group with the second device 200. The first device 100 and the second device 200 may negotiate to determine a Peer-to-Peer Group Owner (P2P GO) and a Peer-to-Peer (P2P) client that may serve as major roles of a group, and may set an operating channel to be used in the group.

In operation S2455, the first device 100 and the second device 200 may perform a Wi-Fi Protected Setup (WPS). In other words, the first device 100 and the second device 200 may exchange PIN information that is input by a device user through a keypad, and may perform a setup according to push button selection by a user.

In operation S2460, the first device 100 and the second device 200 may establish a WFD communication link. Because the process of establishing a WFD communication link is a well-known technology, a detailed description thereof will be omitted herein. An example of using the first communication link as a control channel will be described below in detail with reference to FIG. 25.

Figure 25:
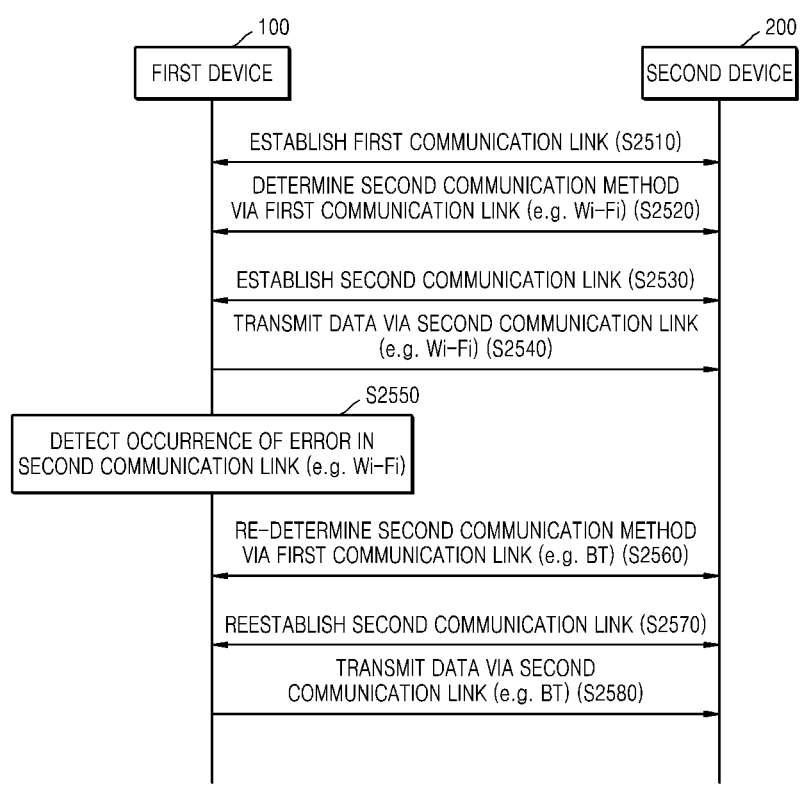
FIG. 25 is a flowchart for explaining a method of re-determining a second communication method via a first communication link according to an embodiment of the present disclosure.

FIG. 25 is a flowchart for explaining a method of re-determining a second communication method via a first communication link according to an embodiment of the present disclosure.

Referring to FIG. 25, in operation S2510, the first device 100 may establish a first communication link with the second device 200. For example, the first device 100 may establish a BLE communication link, an ANT+ communication link, an NFC link, a sound communication link, a ZigBee communication link, and/or the like to be used as a control channel. However, various embodiments of the present disclosure are not limited thereto.

In operation S2520, the first device 100 may determine a second communication method via the first communication link. For example, the first device 100 may determine WFD as the second communication method.

In operation S2530, the first device 100 may establish a second communication link by using the second communication method. For example, the first device 100 may establish a WFD communication link with the second device 200. Because this process is already described above with reference to FIG. 24B, a detailed description thereof is omitted herein.

In operation S2540, the first device 100 may transmit data to the second device 200 via the second communication link.

In operation S2550, the first device 100 may detect occurrence of an error in the second communication link (e.g., a WFD communication link). For example, the first device 100 may detect that data transmission via the second communication link is stopped or a transmission speed of the second communication link is reduced to be lower than or equal to a reference speed (e.g., 1 Mbps).

In this case, in operation S2560, the first device 100 may re-determine the second communication method via the first communication link. For example, the first device 100 may negotiate with the second device 200 a change of the second communication method from the WFD communication method to a Bluetooth communication method.

In operation S2570, the second communication link may be reestablished through the Bluetooth communication method.

In operation S2580, the first device 100 may transmit data via the second communication link (e.g., the Bluetooth communication link). The first device 100 may transmit data to the second device 200 continuously from a time point when the data transmission through the WFD is stopped or may retransmit the data to the second device 200 via the Bluetooth communication link from the beginning. A method that the second device 200 communicates with the first device 100 will be described below in detail with reference to FIG. 26.

FIG. 26 is a flowchart for explaining a communication method of a second device according to an embodiment of the present disclosure.

Referring to FIG. 26, in operation S2610, the second device 200 may broadcast advertisement information including identifier information and capability information by using a plurality of communication methods. The advertisement information may further include information about a state of the second device 200, a preferred communication method of the second device 200, and/or the like.

The second device 200 according to various embodiments of the present disclosure may determine a plurality of communication methods to broadcast advertisement information. For example, the second device 200 may select the BLE communication method, the sound communication method, and the NFC method as communication methods to broadcast the advertisement information. In addition, the second device 200 may determine whether to simultaneously or sequentially broadcast the advertisement information by using a plurality of communication methods.

In operation S2620, the second device 200 may receive a response to the advertisement information from the second device 200 through the first communication method among the communication methods. For example, the second device 200 may receive advertisement information including the identifier information of the first device 100, the capability information about a communication method supported by the first device 100, and information about a communication method preferred by the first device 100, through the first communication method, or may receive a connection request or a negotiation request from the first device 100.

In this case, in operation S2630, the second device 200 may establish a first communication link with the first device 100 by using the first communication method. The first communication method according to the present embodiment may be at least one of a BLE communication method, an ANT+ communication method, an NFC method, a sound communication method, a ZigBee communication method, and/or the like. However, various embodiments of the present disclosure are not limited thereto.

In operation S2640, the second device 200 may determine a second communication method to communicate data with the first device 100 via the first communication link. The second communication method according to various embodiments of the present disclosure may be at least one of the Bluetooth communication method, the Wi-Fi communication method, the WFD communication method, the UWB communication method, the mobile communication network such as 2G, 3G, or 4G, and/or the like. However, various embodiments of the present disclosure are not limited thereto.

The second device 200 according to various embodiments of the present disclosure may receive a connection request or a negotiation request related to the second communication method from the first device 100 via the first communication link. The second device 200 may transmit an acceptance message to the connection request or negotiation request to the first device 100.

In operation S2650, the second device 200 may establish a second communication link with the first device 100 by using the second communication method. Because this process is already described above with reference to FIGS. 24A and 24B, a detailed description thereto is omitted herein.

Although in FIG. 26 the second device 200 establishes a communication link with the first device 100 (e.g., a single device), various embodiments of the present disclosure are not limited thereto. In other words, the second device 200 may establish a communication link with each of a plurality of devices. For example, the second device 200 may broadcast advertisement information by using a plurality of communication methods. In doing so, the second device 200 may receive a response with respect to the advertisement information from a plurality of devices and establish a first communication link and a second communication link with each device.

The second device 200 may detect an occurrence of an error in the second communication link. In this case, the second device 200 may request a change of the second communication link from the first device 100 via the first communication link.

Figure 28:
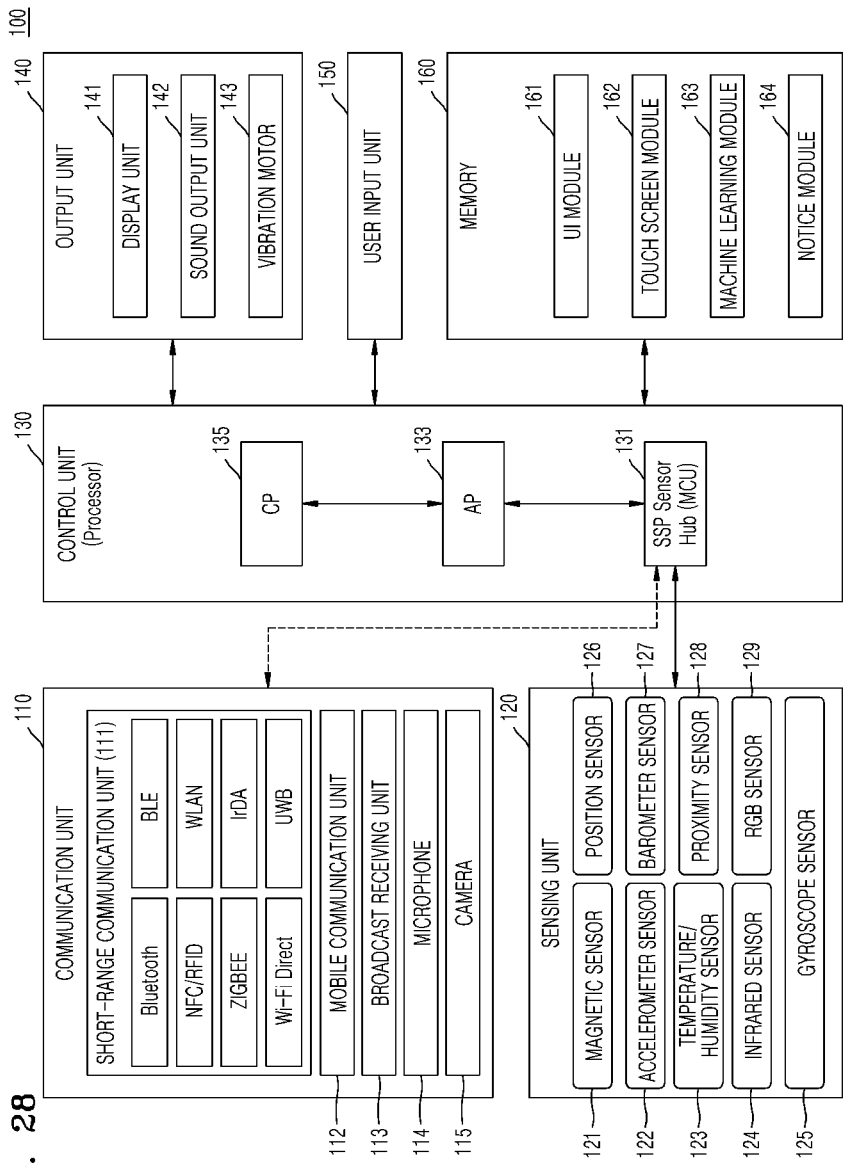

FIGS. 27 and 28 are block diagrams schematically illustrating a structure of a first device according to an embodiment of the present disclosure.

Referring to FIG. 27, the first device 100 according to various embodiments of the present disclosure may include a communication unit 110, a sensing unit 120, and a control unit (processor) 130. However, the aforementioned elements are not all essential elements and the first device 100 may be embodied by more or less elements than the above elements.

For example, as illustrated in FIG. 28, the first device 100 according to various embodiments of the present disclosure may further include an output unit 140, a user input unit 150, and a memory 160 in addition to the communication unit 110, the sensing unit 120, and the control unit 130. These elements are described below in detail.

The communication unit 110 may include one or more elements for allowing communication between the first device 100 and the second device 200 or between the first device 100 and a server. For example, the communication unit 110 may include a short range communication unit 111, a mobile communication unit 112, a broadcast receiving unit 113, a microphone 114, and a camera 115.

The short range communication unit 111 may include a Bluetooth communication unit, a BLE communication unit, an NFC/RFID unit, a Wi-Fi communication unit, a ZigBee communication unit, an IrDA communication unit, a WFD communication unit, an UWB communication unit, an Ant+ communication unit, and/or the like. However, various embodiments of the present disclosure are not limited thereto.

The mobile communication unit 112 communicates a wireless signal with at least one of a base station, an external terminal, and a server on a mobile communication network. The wireless signal may include various types of data according to communication of a sound call signal, a video call signal, or a text/multimedia message.

The broadcast receiving unit 113 receives a broadcast signal and/or information related to broadcast from the outside through a broadcast channel. The broadcast channel may include a satellite channel and a ground wave channel. According to various embodiments of the present disclosure, the first device 100 may not include the broadcast receiving unit 113.

The microphone 114 receives an input of an external sound signal and processes the received sound signal to electrical sound data. For example, the microphone 114 may receive a sound signal transmitted by the second device 200. The sound signal transmitted by the second device 200 may include the identifier information of the second device 200, the capability information about a communication method supported by the second device 200, and information about a communication method preferred by the second device 200. However, various embodiments of the present disclosure are not limited thereto. The microphone 114 according to various embodiments of the present disclosure may transmit the processed sound data to the control unit 130. According to various embodiments of the present disclosure, the microphone 114 may be connected to a sensor hub 131.

The camera 115 may obtain an image frame such as a still image or a moving picture through an image sensor in a video call mode or a photographing mode. An image captured through the image sensor may be processed by the control unit 130 or a separate image processing unit (not shown). For example, the camera 115 may recognize a one-dimensional barcode, a two-dimensional barcode (e.g., a QR code), a three-dimensional barcode, a color code, a gray code, and/or the like, which are displayed on the screen of the second device 200.

The communication unit 110 may scan the second device 200 that provides identifier information and capability information through a plurality of communication methods. The communication unit 110 may communicate data with the second device 200. For example, when the communication unit 110 is switched to an active state by the control unit 130, the communication unit 110 may receive information broadcasted by the second device 200 (e.g., the identifier information of the first device 100, information about a communication method, and/or the like). In addition, the communication unit 110 may request a communication connection or negotiation request for determined a communication method from the second device 200 based on the information broadcasted by the second device 200.

The sensing unit 120 may detect a state of the first device 100 or an ambient state of the first device 100 and transmit the detected information to the control unit 130. The sensing unit 120 may include at least one of the magnetic sensor 121, an accelerometer sensor 122, a temperature/humidity sensor 123, an infrared sensor 124, a gyroscope sensor 125, a position sensor 126 (e.g., a Global Positioning System (GPS)), a barometer sensor 127, a proximity sensor 128, an RGB sensor 129 (e.g., an illuminance sensor), and/or the like. However, various embodiments of the present disclosure are not limited thereto. Because the function of each sensor may be intuitively inferred by one of ordinary skill from the name thereof, a detailed description thereof is omitted herein.

The sensing unit 120 may detect occurrence of a predetermined event of triggering a device scan. For example, the sensing unit 120 may detect an event of unlocking a lock screen, an event of executing a preset application, an event of selecting a preset button, and/or the like. However, various embodiments of the present disclosure are not limited thereto.

The control unit 130 typically controls an overall operation of the first device 100. In other words, the control unit 130 executes programs stored in the memory 160 in order to generally control the communication unit 110, the sensing unit 120, the output unit 140, the user input unit 150, the memory 160, and/or the like.

The control unit 130 may include the sensor hub 131 of the SSP. The sensor hub 131 may be embodied by hardware or software, or by a combination of hardware and software. For example, the sensor hub 131 may include a Micro-Control Unit (MCU).

The sensor hub 131 according to various embodiments of the present disclosure may be connected to the sensing unit 120 and may collect sensing information from the sensing unit 120. For example, the sensor hub 131 may obtain magnetic field information detected by the magnetic sensor 121.

The sensor hub 131 according to various embodiments of the present disclosure may compare the magnetic field information obtained through the magnetic sensor 121 with preset reference magnetic field information. If the magnetic field information obtained through the magnetic sensor 121 is greater than or equal to the preset reference magnetic field information, the sensor hub 131 may wake up an Application Processor (AP) 133 from a sleep mode.

While monitoring color information detected by the RGB sensor 129, the sensor hub 131 may wake up the AP 133 in a sleep mode if a similarity between the color information and reference color information is greater than or equal to a predetermined value (e.g., 90%). In addition, while monitoring sound information detected by the microphone 114, the sensor hub 131 may wake up the AP 133 in a sleep mode if a similarity between the sound information and the reference sound information is greater than or equal to a predetermined value (e.g., 90%). The SSP will be described below in detail with reference to FIG. 29.

The control unit 130 may include the AP 133 and a Communication Processor (CP) 135. The AP 133 may control the execution of various applications stored in the memory 160. For example, when the value of the magnetic field information obtained through the magnetic sensor 121 is greater than or equal to the value of the preset reference magnetic field information, the AP 133 may switch the communication unit 110 in an inactive state to an active state.

According to various embodiments of the present disclosure, the AP 133 may switch a plurality of communication units in an inactive state (e.g., the Bluetooth communication unit, the NFC unit, the Wi-Fi communication unit, the microphone 114, the BLE communication unit, and/or the like), to an active state. For example, the AP 133 may sequentially activate the communication units in a predetermined order or may simultaneously activate the communication units altogether. The control unit 130 may analyze the information broadcasted by the second device 200 that is received through the communication unit 110 in an active state.

The control unit 130 may establish a first communication link with the second device 200 by using the first communication method among the communication methods. The control unit 130 may determine the first communication method among the communication methods based on at least one of power consumption amount information and latency information.

In addition, the control unit 130 may determine a second communication method for communicating data with the second device 200 via the first communication link, and may establish a second communication link with the second device 200 by using the determined second communication method. The control unit 130 may select the second communication method based on the capability information received from the second device 200.

When the use of the second communication link is completed, the control unit 130 according to various embodiments of the present disclosure may determine the termination of the second communication link and the maintenance of the first communication link. In other words, the control unit 130 may terminate the second communication link to reduce the power consumption amount and continuously maintain the first communication link having a small power consumption amount as a control channel.

The control unit 130 may detect an occurrence of an error in the second communication link and may re-determine the second communication method with the second device 200 via the first communication link.

The output unit 140 outputs an audio signal, a video signal, or a vibration signal and may include a display unit 141, a sound output unit 142, a vibration motor 143, and/or the like.

The display unit 141 displays information processed by the first device 100. For example, the display unit 141 may display a User Interface (UI) or a Graphical User Interface (GUI) related to a call when in a call mode. When the scanning of the second device 200 fails, the display unit 141 may display on the screen a message indicating the connection (or scanning) failure. In addition, the display unit 141 may provide on the screen an application related to the second device 200. For example, the display unit 141 may display on the screen a control application for controlling the second device 200 or information about a connection state with the second device 200.

When the display unit 141 and a touch pad form a touch screen in a layer structure, the display unit 141 may be used as an input device in addition to an output device. The display unit 141 may include at least one of a liquid crystal display, a thin film transistor-liquid crystal display, an organic light-emitting diode, a flexible display, a 3D display, an electrophoretic display, and/or the like. The first device 100 may include two or more display units according to the implementation and/or configuration of the first device 100. The two or more display units may be arranged to face each other by using a hinge.

The sound output unit 142 outputs audio data received from the communication unit 110 or stored in the memory 160. In addition, the sound output unit 142 outputs a sound signal related to a function performed by the first device 100 (e.g., a call signal receiving sound, a message receiving sound, and/or the like). The sound output unit 142 may include a speaker, a buzzer, and/or the like.

The sound output unit 142 according to various embodiments of the present disclosure may transmit a sound signal embedded with information to the second device 200. For example, the first device 100 may embed the identifier information of the first device 100, the capability information of the first device 100, the information about a communication method preferred by the first device 100, and the information about a state of the first device 100 in an inaudible range of the sound signal, and may broadcast the sound signal (e.g., to the outside environment) through the sound output unit 142.

The vibration motor 143 may output a vibration signal. For example, the vibration motor 143 may output a vibration signal corresponding to the output of audio data or video data (e.g., call signal receiving sound, message receiving sound, and/or the like). In addition, the vibration motor 143 may output a vibration signal when a touch is input to a touch screen.

The user input unit 150 signifies a device to input data to control the first device 100 by a user. For example, the user input unit 150 may be a keypad, a dome switch, a touch pad such as a capacitive overlay type, a resistive overlay type, an infrared beam type, a surface acoustic wave type, an integral strain gauge type, a piezoelectric type, jog wheel, a jog switch, and/or the like. However, various embodiments of the present disclosure are not limited thereto.

The memory 160 may store a program for processing and controlling the control unit 130 or input/output data (e.g., reference magnetic field information). The memory 160 may include a storage medium of at least one type of a flash memory, a hard disk, a multimedia card micro, a card type memory such as an SD or XD card memory, Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, an optical disc, and/or the like. In addition, the first device 100 may run a web storage or a cloud server that performs a storage function of the memory 160 on the Internet.

The programs stored in the memory 160 may be classified into a plurality of modules according to their functions, for example, into a UI module 161, a touch screen module 162, a machine learning module 163, a notice module 164, and/or the like.

The UI module 161 may provide a specialized UI or GUI in connection with the first device 100 for each application. The touch screen module 162 may detect a user touch gesture on the touch screen and transmit information related to the touch gesture to the control unit 130. The touch screen module 162 according to various embodiments of the present disclosure may recognize and analyze a touch code. The touch screen module 162 may be configured by additional hardware including a controller.

Various sensors may be provided in the touch screen or therearound to detect a touch or proximity touch on the touch screen. A tactile sensor is an example of a sensor to detect a touch on the touch screen. The tactile sensor refers to a sensor that detects a touch of a particular object to a degree that one may sense (e.g., detect) or higher. The tactile sensor may detect various pieces of information such as roughness of a contact surface, hardness of a contact object, a temperature of a contact point, and/or the like.

In addition, a proximity sensor is another example of a sensor for detecting a touch on the touch screen. The proximity sensor refers to a sensor that detects an object approaching a predetermined detection surface or the existence of an object existing therearound by using an electromagnetic field or an infrared ray without any mechanical contact. Examples of the proximity sensor include a transmissive photoelectric sensor, a direct reflective photoelectric sensor, a mirror reflective photoelectric sensor, a high frequency oscillating proximity sensor, a capacitive proximity sensor, a magnetic proximity sensor, an infrared proximity sensor, and/or the like. The user touch gesture may include tapping, touching & holding, double tapping, dragging, panning, flicking, dragging & dropping, swiping, and/or the like.

"Tapping" is a user motion of touching a screen by using a finger or a touch tool such as an electronic pen (e.g., stylus) and then instantly lifting the finger or touch tool from the screen without moving.

"Touching & holding" is a user motion of touching a screen by using a finger or a touch tool such as an electronic pen and then maintaining the above touching motion over a critical time (e.g., 2 seconds), after touching the screen. In other words, a time difference between a touch-in time and a touch-out time is greater than or equal to the critical time (e.g., 2 seconds). When a touch input lasts over the critical time, in order to remind the user whether the touch input is tapping or touching & holding, a feedback signal may be provided in a visual, acoustic, or tactile manner. The critical time may vary according to various embodiments of the present disclosure.

"Double tapping" is a user motion of touching the screen twice by using the finger or touch tool.

"Dragging" is a user motion of touching the screen by using the finger or touch tool and moving the finger or touch tool to another position on the screen while keeping the touching motion. The dragging motion may enable the moving or panning motion of an object.

"Panning" is a user motion of performing a dragging motion without selecting an object. Because no object is selected in the panning motion, no object is moved in a page but the page itself is moved on the screen or a group of objects may be moved within a page.

"Flicking" is a user motion of performing a dragging motion over a critical speed, for example, 100 pixel/s, by using the finger or touch tool. The dragging (panning) motion or the flicking motion may be distinguished based on whether the moving speed of the finger or touch tool is over the critical speed (e.g., 100 pixel/s), or not.

"Dragging & Dropping" is a user motion of dragging an object to a predetermined position on the screen by using the finger or touch tool and then dropping the object at that position.

"Pinching" is a user motion of moving two fingers touching on the screen in opposite directions. The pinching motion is a gesture to magnify (open pinch) or contract (close pinch) an object or a page. A magnification value or a contraction value is determined according to the distance between the two fingers.

"Swiping" is a user motion of touching an object on the screen by using the finger or touch tool and simultaneously moving the object horizontally or vertically by a predetermined distance. A swiping motion in a diagonal direction may not be recognized as a swiping event.

The memory 160 may include a voice recognition module (not shown) that recognizes the voice of a user by using a voice recognition engine and transmits the recognized voice to the control unit 130.

The machine learning module 163 is a module that trains the first device 100 to determine whether a magnetic substance exists around the magnetic sensor 121 by using magnetic field information obtained from the magnetic sensor 121. The machine learning module 163 according to various embodiments of the present disclosure may use a Support Vector Machine (SVM) method. According to the SVM method, when data of white circles and black circles are given for a learning use, the white and black circles are classified into a white circle group and a black circle group mainly based on data located at a boundary between the two groups.

The notice module 164 may generate a signal for notifying an occurrence of an event of the first device 100. The event occurring in the first device 100 may include, for example, call signal receiving, message receiving, a key signal input, schedule notification, and/or the like. The notice module 164 may output a notice signal in the form of a video signal through the display unit 141, a notice signal in the form of an audio signal through the sound output unit 142, and a notice signal in the form of a vibration signal through the vibration motor 143.

The notice module 164 may have a snooze function. For example, when a user sets a notice repetition number to, for example, 5 times, or a notice repetition interval to, for example, 3 minutes, the notice module 164 may output a notice signal a predetermined number of times (e.g., 5 times), at predetermined intervals (e.g., 3 minutes).

Figure 29:
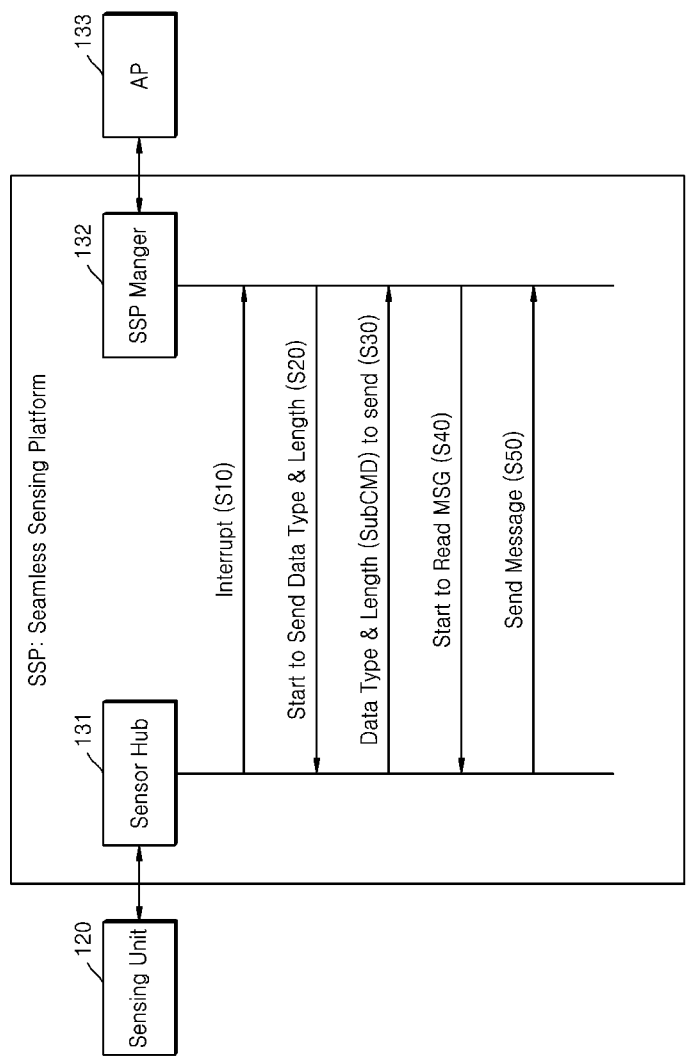
FIG. 29 is a block diagram schematically illustrating a data communication protocol of a Seamless Sensing Platform (SSP) according to an embodiment of the present disclosure.

FIG. 29 is a block diagram schematically illustrating a data communication protocol of an SSP according to an embodiment of the present disclosure.

Referring to FIG. 29, the SSP may include the sensor hub 131 and an SSP manager 132. The sensing unit 120 may be attached on the sensor hub 131 and the SSP manager 132 may be included in a framework of the AP 133.

Accordingly, the sensor hub 131 may receive magnetic field information (e.g., the direction of a magnetic field, the magnitude of a magnetic field, a magnetic force, and/or the like). In operation S10, when the AP 133 in a sleep mode needs to wake up (e.g., when the magnetic field information obtained through the magnetic sensor 121 is greater than or equal to the reference magnetic field information), the sensor hub 131 may send an interrupt signal to the SSP manager 132 to notify that there is data to be sent.

In operation S20, the SSP manager 132 may send to the sensor hub 131 a signal requesting data type and length to be sent by the sensor hub 131.

In this case, in operation S30, the sensor hub 131 may send to the SSP manager 132 a content regarding the data type and length to be sent.

In operation S40, the SSP manager 132 may send a receiving ready message (Start to Read MSG) to the sensor hub 131.

In operation S50, when the receiving the Start to Read MSG, the sensor hub 131 may process the magnetic field information, information related to the communication unit to be switched to an active state, and/or the like into a predetermined packet and send the processed information to the SSP manager 132. In this case, the AP 133 in the sleep mode wakes up.

Figure 30:
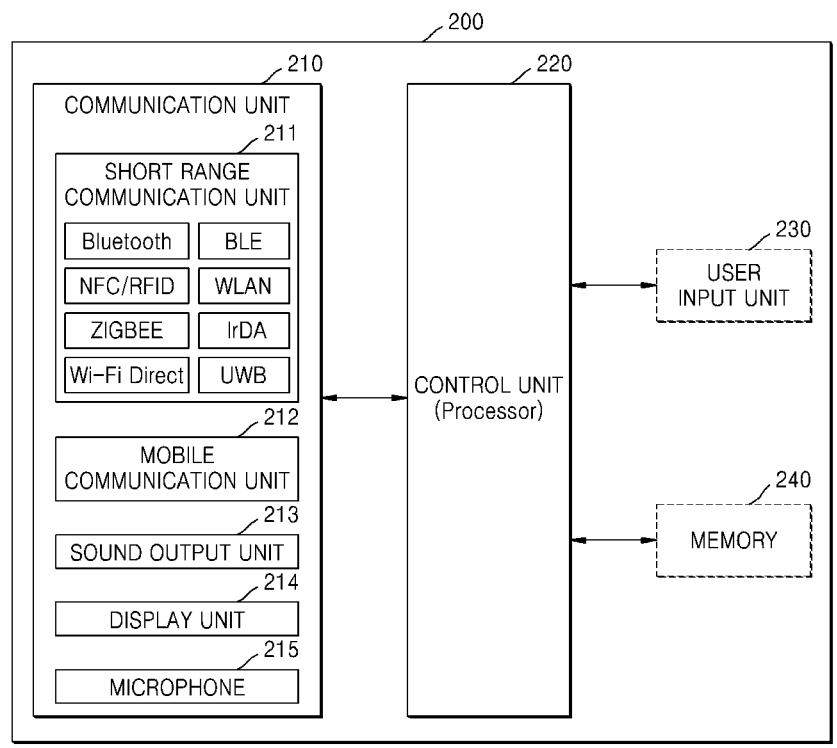
FIG. 30 is a block diagram schematically illustrating a structure of a second device according to an embodiment of the present disclosure.

FIG. 30 is a block diagram schematically illustrating a structure of a second device according to an embodiment of the present disclosure.

Referring to FIG. 30, the second device 200 according to various embodiments of the present disclosure may include a communication unit 210, a control unit 220, a user input unit 230, and a memory 240. However, the aforementioned elements are not all essential elements and the second device 200 may be embodied by more or less elements than the above elements.

The communication unit 210 may include one or more elements for allowing communication between the first device 100 and the second device 200 or between the second device 200 and a server. For example, the communication unit 210 may include a short range communication unit 211, a mobile communication unit 212, a sound output unit 213, a display unit 214, and a microphone 215.

The short range communication unit 211 may include at least one of a Bluetooth communication unit, a BLE communication unit, an NFC/RFID unit, a Wi-Fi communication unit, a ZigBee communication unit, an IrDA communication unit, a WFD communication unit, an UWB communication unit, an Ant+ communication unit, and/or the like. However, various embodiments of the present disclosure are not limited thereto.

The mobile communication unit 212 communicates a wireless signal with at least one of a base station, an external terminal, and a server on a mobile communication network. The wireless signal may include various types of data according to communication of a sound call signal, a video call signal, or a text/multimedia message.

The sound output unit 213 outputs audio data received from the outside or stored in the memory 240. In addition, the sound output unit 213 outputs a sound signal related to a function performed by the second device 200 (e.g., a call signal receiving sound, message receiving sound, and/or the like). The sound output unit 213 may include a speaker, and/or the like.

The sound output unit 213 according to various embodiments of the present disclosure may broadcast (e.g., to the outside environment) a sound signal embedded with information. For example, the second device 200 may embed the identifier information of the second device 200, the capability information of the second device 200, the information about a communication method preferred by the second device 200, the information about a state of the second device 200 in an inaudible range of the sound signal, and/or the like, and may broadcast the sound signal (e.g., to the outside environment) through the sound output unit 213.

The display unit 214 displays and outputs information processed by the first device 100. For example, the display unit 214 may display a one-dimensional barcode, a two-dimensional barcode, for example a QR code, a three-dimensional barcode, a color code, a gray code, and/or the like, which include advertisement information.

When the display unit 241 and a touch pad form a touch screen in a layer structure, the display unit 241 may be used as an input device in addition to an output device. The display unit 241 may include at least one of a liquid crystal display, a thin film transistor-liquid crystal display, an organic light-emitting diode, a flexible display, a 3D display, an electrophoretic display, and/or the like.

The microphone 215 receives an external sound signal as an input and processes the received sound signal to electrical voice data. For example, the microphone 215 may receive a sound signal transmitted by the first device 100. The sound signal transmitted by the first device 100 may include the identifier information of the first device 100, the capability information about a communication method supported by the first device 100, information about a communication method preferred by the first device 100, and/or the like. However, various embodiments of the present disclosure are not limited thereto. The microphone 215 according to various embodiments of the present disclosure may transmit the processed sound data to the control unit 220.

The communication unit 210 may broadcast advertisement information including identifier information and capability information by using a plurality of communication methods. The communication unit 210 may receive a response to the advertisement information from the first device 100 through the first communication method from among the communication methods. The first communication method may be at least one of a BLE communication method, an ANT+ communication method, an NFC method, a sound communication method, a ZigBee communication method, and/or the like. However, various embodiments of the present disclosure are not limited thereto.

The control unit 220 typically controls an overall operation of the second device 200. In other words, the control unit 220 executes programs stored in the memory 240 in order to generally control the communication unit 210, the user input unit 230, the memory 240, and/or the like.

The control unit 220 may switch the other communication units except for the first communication unit corresponding to the first communication method from among the communication units corresponding to the communication methods to an inactive state. In other words, when a response to the advertisement information is received from the first device 100 through the first communication method, the second device 200 may reduce the power consumption amount by making the other communication units except for the first communication unit inactive.

The user input unit 230 signifies a device for inputting data to control the second device 200 by a user. For example, the user input unit 230 may be a keypad, a dome switch, a touch pad such as a capacitive overlay type, a resistive overlay type, an infrared beam type, a surface acoustic wave type, an integral strain gauge type, a piezoelectric type, a jog wheel, a jog switch, and/or the like. However, various embodiments of the present disclosure are not limited thereto.

When the user input unit 230 includes a touch pad, the user input unit 230 may detect a user touch gesture. The user touch gesture may be tapping, touching & holding, double tapping, dragging, panning, flicking, dragging & dropping, swiping, and/or the like.

The memory 240 may store a program for processing and controlling the control unit 220 or input/output data, for example, reference magnetic field information. The memory 240 may include a storage medium of at least one type of a flash memory, a hard disk, a multimedia card micro, a card type memory such as an SD or XD card memory, RAM, SRAM, ROM, EEPROM, PROM, a magnetic memory, a magnetic disc, and an optical disc. In addition, the second device 200 may run a web storage or a cloud server that performs a storage function of the memory 240 on the Internet.

Various embodiments of the present disclosure can also be embodied as computer readable codes on a non-transitory computer readable recording medium. The non-transitory computer readable recording medium may be any data storage device that can store data which can be thereafter read by a computer system. Examples of the non-transitory computer readable recording medium include ROM, RAM, CD-ROMs, magnetic tapes, floppy disks, optical data storage devices, and/or the like. The non-transitory computer readable recording medium can also be distributed over network coupled computer systems so that the computer readable code is stored and executed in a distributed fashion. In addition, functional programs, codes, and code segments for accomplishing various embodiments of the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method used by a first device that communicates with a second device, the method comprising:
   detecting an occurrence of a predetermined event related to a device scan;
   scanning the second device that provides identifier information and capability information through a plurality of communication methods based on the occurrence of the predetermined event;
   establishing a first communication link with the scanned second device by using a first communication method from among the plurality of communication methods;
   determining a second communication method for communicating data with the second device via the first communication link; and
   establishing a second communication link with the second device by using the determined second communication method.

2. The method of claim 1, wherein the detecting of the occurrence of the predetermined event comprises:
   detecting at least one of an event of unlocking a lock screen, an event of executing a preset application, and an event of selecting a preset button.

3. The method of claim 1, wherein, in the detecting of the occurrence of the predetermined event, the predetermined event is detected based on at least one of magnetic field information obtained through a magnetic sensor, color information obtained through a Red, Green, Blue (RGB) sensor, and sound information obtained through a microphone.

4. The method of claim 1, wherein the detecting of the second device comprises:
   switching a communication unit in an inactive state to an active state based on the occurrence of the predetermined event; and
   receiving from the second device the identifier information and the capability information through the communication unit that is switched to the active state.

5. The method of claim 4, wherein the detecting of the second device comprises:
   switching a plurality of communication units in an inactive state to an active state based on the occurrence of the predetermined event; and
   receiving from the second device the identifier information and the capability information through the plurality of communication units that are switched to the active state.

6. The method of claim 1, wherein the establishing of the first communication link comprises:
   determining the first communication method from among the plurality of communication methods based on at least one of power consumption amount information and latency information; and
   transmitting at least one of the identifier information, the capability information, and information about a preferred communication method to the second device through the determined first communication method.

7. The method of claim 1, wherein the determining of the second communication method comprises:
   selecting the second communication method based on the capability information received from the second device; and
   transmitting a connection request or a negotiation request regarding the selected second communication method to the second device via the first communication link.

8. The method of claim 7, wherein the selecting of the second communication method comprises:
   receiving from the second device at least one of information about a state of the second device and information about a preferred communication method; and
   selecting the second communication method by considering at least one of the information about a state of the second device and the information about a preferred communication method.

9. The method of claim 1, further comprising:
   transmitting data to the second device via the second communication link; and
   determining at least one of whether to terminate the second communication link, and whether to maintain the first communication link, when the data transmission is completed.

10. The method of claim 9, further comprising:
    receiving a request for establishing the terminated second communication link from the second device via the first communication link; and
    reestablishing the second communication link in response to the request.

11. The method of claim 1, further comprising:
    detecting an occurrence of an error in the second communication link; and
    re-determining the second communication method for communicating data with the second device via the first communication link.

12. The method of claim 1,
    wherein the plurality of communication methods comprise at least two of a Bluetooth Low Energy (BLE) communication method, an ANT+ communication method, a Near Field Communication (NFC) method, a sound communication method, a ZigBee communication method, a two-dimensional barcode method, and a touch code communication method,
    wherein the first communication method comprises at least one of the BLE communication method, the ANT+ communication method, the NFC method, the sound communication method, and the ZigBee communication method, and
    wherein the second communication method comprises at least one of a Bluetooth communication method, a Wi-Fi communication method, a UWB communication method, and a mobile communication network.

13. A computer readable recording medium having recorded thereon a program for executing the method of claim 1.

14. A first device comprising:
a sensing unit configured to detect an occurrence of a predetermined event related to a device scan;
a communication unit configured to scan a second device that that provides identifier information and capability information through a plurality of communication methods based on the occurrence of the predetermined event; and
a control unit configured to:
establish a first communication link with the scanned second device by using a first communication method among the plurality of communication methods,
determine a second communication method for communicating data with the second device, via the first communication link, and
establish a second communication link with the second device by using the determined second communication method.

15. The first device of claim 14, wherein the control unit is further configured to determine the first communication method among the plurality of communication methods based on at least one of power consumption amount information and latency information.

16. The first device of claim 14,
wherein the control unit is further configured to select the second communication method based on the capability information received from the second device, and
wherein the communication unit is further configured to transmit a connection request or a negotiation request regarding the selected second communication method to the second device via the first communication link.

17. The first device of claim 14,
wherein the communication unit is further configured to transmit data to the second device via the second communication link, and
wherein the control unit is further configured to determine at least one of whether to terminate the second communication link, and whether to maintain the first communication link, when the data transmission is completed.

18. The first device of claim 14, wherein the control unit is further configured to:
detect occurrence of an error in the second communication link, and
re-determine the second communication method for communicating data with the second device via the first communication link.

19. A method of operating an electronic apparatus, the method comprising:
monitoring at least one of physical states outside the electronic apparatus, which is performed by the electronic apparatus, via at least one of a microphone, an optical sensor, and a geomagnetic sensor;
determining whether a monitored physical state satisfies a selected condition, which is performed by the electronic apparatus;
switching at least one communication unit of communication units to an active state based on at least a part of the physical state satisfying the selected condition, which is performed by the electronic apparatus; and
discovering, by using the switched at least one communication unit to the active state, other electronic apparatuses outside the electronic apparatus.

20. The method of claim 19, wherein the determining of whether a monitored physical state satisfies a selected condition comprises:
determining whether a value indicating the monitored physical state is greater than or equal to or exceeds a threshold.

21. The method of claim 19, wherein the determining of whether a monitored physical state satisfies a selected condition comprises:
determining whether a state in which a value indicating the monitored physical state is greater than or equal to or exceeds a threshold is maintained for more than a selected time.

22. The method of claim 19, wherein, in the discovering of other electronic apparatuses outside the electronic apparatus, a first communication module using a first communication method is used.

23. The method of claim 22, wherein the first communication method comprises at least one of Bluetooth Low Energy (BLE), Ant+, sound, Near Field Communication (NFC), and Zigbee.

24. The method of claim 22, further comprising:
after the discovering other electronic apparatuses outside the electronic apparatus, establishing a communication link by using a second communication module using a second communication method, which is performed by the electronic apparatus.

25. The method of claim 24, wherein the second communication method comprises at least one of Wi-Fi, Bluetooth, Ultra WideBand (UWB), and mobile communication.

26. An electronic apparatus comprising:
at least one sensor;
at least one antenna; and
at least one processor,
wherein the at least one processor is configured to:
monitor at least one of physical states outside the electronic apparatus via the sensor,
determine whether a monitored physical state satisfies a selected condition,
switch at least one communication unit of communication units to an active state based on at least a part of the physical state satisfying the selected condition, and
discover, by using the switched at least one communication unit to the active state, other electronic apparatuses outside the electronic apparatus.

27. A communication method for communication between a first device and a second device, the method comprising:
scanning, upon detection of a predetermined event, for at least one of identifier information and capability information being provided by the second device via a plurality of communication technologies;
establishing a first communication link with the scanned second device by using a first communication technology from among the plurality of communication technologies;
determining a common communication technology by which data is to be communicated between the first device and the scanned second device as a second communication technology; and
establishing a second communication link with the scanned second device by using the second communication technology.

28. The method of claim 27, wherein the predetermined event is based on at least one of user input from the user of the first device, and automatic detection of the second device within proximity of the first device.

29. The method of claim 27, wherein the scanning for the at least one of the identifier and the capability information provided by the second device comprises:
- sequentially activating one of the plurality of communication technologies,
- scanning for the at least one of the identifier and the capability information, and
- deactivating the one of the plurality of communication technologies, until the earlier of the at least one of the identifier and the capability information is received and all of the plurality of communication technologies have been activated, used for scanning, and deactivated.

* * * * *